US006881391B1

(12) United States Patent
Sechrist

(10) Patent No.: US 6,881,391 B1
(45) Date of Patent: Apr. 19, 2005

(54) METHOD FOR REMOVING HALOGEN FROM A VENT STREAM

(75) Inventor: Paul A. Sechrist, South Barrington, IL (US)

(73) Assignee: UOP LLC, Des Plaines, IL (US)

( * ) Notice: Subject to any disclaimer, the term of this patent is extended or adjusted under 35 U.S.C. 154(b) by 87 days.

(21) Appl. No.: 10/618,932

(22) Filed: Jul. 14, 2003

Related U.S. Application Data

(63) Continuation-in-part of application No. 10/007,853, filed on Nov. 5, 2001, now Pat. No. 6,790,802.

(51) Int. Cl.[7] ................................................ A62D 3/00
(52) U.S. Cl. ..................................... 423/240 S; 502/35
(58) Field of Search ........................ 423/240 R, 240 S; 588/206, 248; 502/35

(56) References Cited

U.S. PATENT DOCUMENTS

| 4,687,637 A | 8/1987 | Greenwood .................. 422/62 |
| 5,336,834 A | 8/1994 | Zarchy et al. ............... 587/737 |
| 5,516,963 A | 5/1996 | Zarchy et al. ............... 585/737 |
| 5,705,730 A | 1/1998 | Zarchy et al. ............... 585/738 |
| 5,837,636 A | 11/1998 | Sechrist et al. ................ 502/35 |
| 5,965,473 A | 10/1999 | Sechrist et al. ................ 502/35 |
| 6,117,809 A | 9/2000 | Sechrist et al. ................ 502/35 |

Primary Examiner—Stanley S. Silverman
Assistant Examiner—Edward M. Johnson
(74) Attorney, Agent, or Firm—John G. Tolomei; Michael A. Moore

(57) ABSTRACT

A method for decreasing the environmental release of a halogen from a process for regenerating catalyst particles in a catalyst bed of a regeneration zone is disclosed.

21 Claims, 10 Drawing Sheets

METHOD FOR REMOVING HALOGEN FROM A VENT STREAM

CROSS-REFERENCE TO RELATED APPLICATION

This application is a continuation-in-part of U.S. application Ser. No. 10/007,853, filed Nov. 5, 2001 now U.S. Pat. No. 6,790,802, the entire contents of which are hereby incorporated herein by reference.

FIELD OF THE INVENTION

The invention relates to a process for regenerating catalyst particles in the presence of halogen.

BACKGROUND OF THE INVENTION

Numerous hydrocarbon conversion processes are widely used to alter the structure or properties of hydrocarbon streams. Such processes include isomerization from straight chain paraffinic or olefinic hydrocarbons to more highly branched hydrocarbons, dehydrogenation for producing olefinic or aromatic compounds, reforming to produce aromatics and motor fuels, alkylation to produce commodity chemicals and motor fuels, transalkylation, and others.

Many such processes use catalysts to promote hydrocarbon conversion reactions. These catalysts tend to deactivate for a variety of reasons, including the deposition of carbonaceous material or coke upon the catalyst, sintering or agglomeration or poisoning of catalytic metals on the catalyst, and/or loss of catalytic metal promoters such as halogens. Consequently, these catalysts are typically reactivated in a process called regeneration. Reactivation can thus include, for example, removing coke from the catalyst by burning (combustion), redispersing catalytic metals such as platinum on the catalyst, oxidizing such catalytic metals, reducing such catalytic metals, replenishing catalytic promoters such as halogens on the catalyst, and drying the catalyst.

While catalyst regeneration can be conducted in fixed catalyst beds, it is commonly carried out in a moving bed regeneration zone that is associated with a moving bed reaction zone. Fresh catalyst particles are fed to a reaction zone, which may be comprised of several reactors, and the particles flow through the zone by gravity. Catalyst is withdrawn from the bottom of the reaction zone and transported to a regeneration zone where a regeneration process consisting of one or more steps is used to regenerate the catalyst to restore its full reaction promoting ability. Catalyst flows by gravity through the various regeneration steps and then is withdrawn from the regeneration zone and furnished to the reaction zone. Movement of catalyst through the zones is often referred to as continuous though, in practice, it is semicontinuous. By semicontinuous movement is meant the repeated transfer of relatively small amounts of catalyst at closely spaced points in time. For example, one batch per minute may be withdrawn from the bottom of a regeneration zone and withdrawal may take one-half minute, that is, catalyst will flow for one-half minute. If the inventory in the regeneration zone is large, the catalyst bed may be considered to be continuously moving. A moving bed system has the advantage of maintaining production while the catalyst is removed or replaced. U.S. Pat. Nos. 5,837,636 and 6,117,809 describe moving bed regeneration zones where coke combustion, metal redispersion, metal oxidation, metal reduction, promoter addition, and catalyst drying occur.

One of the problems during regeneration of halogen-containing catalysts is loss of halogen from the catalyst. This happens when catalyst particles are contacted with gases that, while regenerating the catalyst particles, tend also to remove halogen from the catalyst particles. Apart from any adverse effect of halogen loss on catalytic activity, venting of a gas stream containing a halogen from the process poses an environmental concern. The environmental concern can be abated either by scrubbing the vent gas with an aqueous, basic solution or by adsorbing the halogen from the vent gas on an adsorbent. The halogen can also be adsorbed on the catalyst particles themselves as disclosed in U.S. Pat. Nos. 5,837,636 and 6,117,809, for example.

Adsorption of the halogen on the catalyst particles is advantageous since it does not involve the expense of a separate adsorbent and its associated vessel(s) and equipment. However, in some circumstances adsorbing the halogen on catalyst particles that circulate through moving bed reaction and regeneration zones is complicated and expensive.

A process is sought that removes halogens from gas streams vented from processes for regenerating catalyst particles.

SUMMARY OF THE INVENTION

The method disclosed herein uses a bed containing a material that is used first to remove halogen carried by a stream being vented from the process and then is used to return halogen to the catalyst in a catalyst regeneration process.

The halogen may be removed from the stream being vented and retained on the material in the bed by any chemical or physical interaction between the halogen and the bed. Such interactions include but are not limited to adsorption and/or absorption.

To simplify the description that follows, this interaction is referred to herein as "adsorption" and the material in the bed is referred to herein as an "adsorbent." The removal of halogen from the adsorbent is referred to herein as "desorption."

In embodiments of the method disclosed herein, an adsorbent is contacted with streams and/or at conditions that may be different from those used during catalyst regeneration. In the method disclosed herein, this adsorbent is in a bed outside of the flowing stream of catalyst particles that flows through the moving bed regeneration zone. In embodiments that use a moving bed reaction zone too, the adsorbent bed can be outside of the flowing loop of catalyst particles that circulates through the moving bed reaction and regeneration zones. One embodiment disclosed herein uses two adsorbent beds—one bed for removing halogen from the stream and another bed from which halogen is removed, and the functions of the two beds are switched periodically. In these embodiments, the adsorbent beds can be designed and sized independent of any requirements of flowing catalyst. Thus, their designs and sizes can be optimized for their specific functions, and the method disclosed herein can be simpler and cheaper than existing methods.

Other embodiments are described in the detailed description below.

INFORMATION DISCLOSURE

Figure 1:
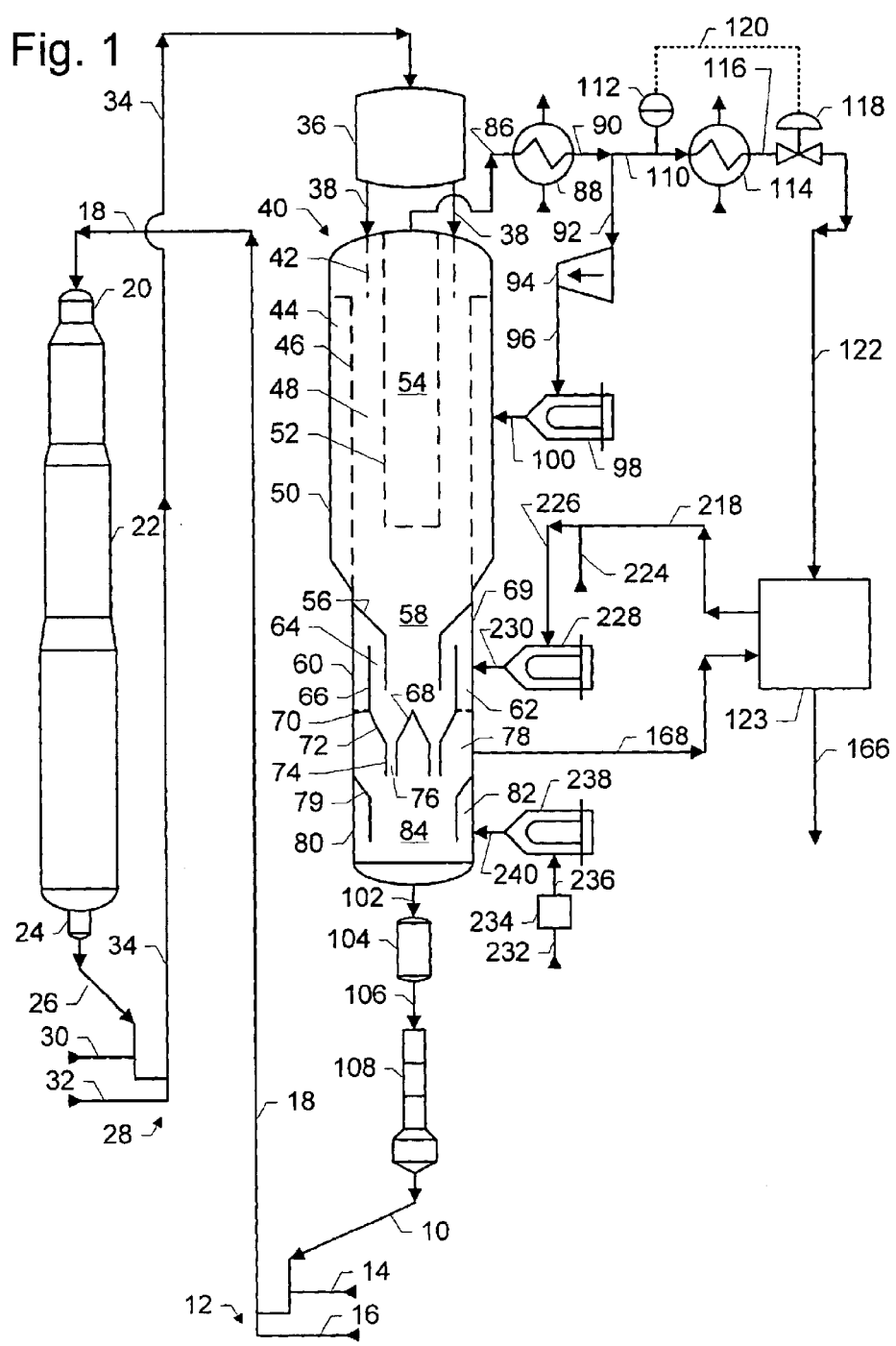
FIGS. 1–10 are process flow diagrams showing embodiments of the method disclosed herein.

U.S. Pat. No. 5,336,834 (Zarchy et al.) discloses an adsorption zone in combination with a catalytic hydrocarbon conversion process that keeps chlorine-containing compounds in the catalyst bed and prevents contamination of product streams with chlorine-containing compounds. The contents of U.S. Pat. No. 5,336,834 are hereby incorporated herein by reference.

U.S. Pat. No. 5,516,963 (Zarchy et al.) discloses an adsorption arrangement in combination with a catalytic hydrocarbon conversion process for retaining non-hydrocarbon materials that act to enhance the operation of the conversion zone by use of an adsorption zone arrangement to keep the compounds in recirculation about a reaction zone.

U.S. Pat. No. 5,705,730 (Zarchy et al.) discloses an isomerization process using a chloride promoted catalyst wherein an adsorption zone arrangement operates to maintain chloride compounds in the reaction zone and to prevent contamination of product streams with chloride compounds.

U.S. Pat. No. 5,837,636 (Sechrist et al.) discloses a method for decreasing the emissions of chlorine-containing species from a process for contacting catalyst particles with the recycle stream containing chlorine-containing species. An adsorption arrangement in combination with a regeneration section of the catalytic hydrocarbon conversion process retains chlorine-containing species that would otherwise be released from the process. The contents of U.S. Pat. No. 5,837,636 are hereby incorporated herein by reference.

U.S. Pat. No. 5,965,473 (Sechrist et al.) discloses a method for recovering chlorine-containing materials from the effluent gases during catalyst regeneration in a hydrocarbon conversion process with a cyclic regeneration operation.

U.S. Pat. No. 6,117,809 (Sechrist et al.) discloses a method for recovering chlorine-containing species from an outlet stream of the zone in which the catalytic metal of a chloride-containing catalyst is reduced.

U.S. Pat. No. 4,687,637 (Greenwood) discloses a catalyst regeneration apparatus, where the oxygen content of the gas flowing to the combustion zone is monitored and the amount of gas vented from the drying zone is adjusted in order to maintain the desired concentration of oxygen.

DETAILED DESCRIPTION

The method disclosed herein recovers halogen removed from hydrocarbon conversion catalyst particles undergoing regeneration. Halogen is present in an effluent stream from a catalyst bed undergoing regeneration. A portion of the effluent stream contacts adsorbent to remove halogen. Subsequently halogen is removed from the adsorbent using a stream that has been used or will thereafter be used in regeneration. When this stream containing halogen removed from the adsorbent is used in regeneration, halogen is returned to catalyst particles.

The method disclosed herein uses at least one adsorbent. The adsorbent removes at least one halogen from a portion of the effluent stream. Any suitable adsorbent may be used. Suitable adsorbents include molecular sieves such as zeolites, clays, inorganic polymers such as alumina and activated alumina, zirconia, carbon, activated carbon, organic polymers such as resin adsorbent, etc. Suitable aluminas include gamma, alpha, theta, etc. One embodiment uses the ion exchanged clinoptilolites described in U.S. Pat. No. 5,336,834. These adsorbents may not be equivalent in terms of their capabilities of removing halogen or of having halogen removed from them.

In one embodiment, the adsorbent is selected so that its operating conditions (i.e., temperature, pressure, halogen concentration, and water concentration) during adsorption or desorption correspond either to regeneration conditions or to conditions that can be readily attained from the regeneration conditions. For example, adsorption conditions that correspond to the regeneration conditions but for a lower temperature and/or pressure can be easily attained by passing the vent gas from the coke combustion bed through a cooler and/or a pressure-reducing valve.

In one embodiment, the adsorbent's select physical properties that affect reversible adsorption do not degrade significantly when the adsorbent is used for adsorption and desorption. For example, in one embodiment when an adsorbent with a high surface area is used, the repeated use of the adsorbent for adsorption and desorption does not significantly decrease the adsorbent's surface area. Thus, while silica gel may be used as the adsorbent, it is typically not used. The adsorbent may contain a Periodic Table Group 8-10 element or a noble metal component such as gold, silver, platinum, palladium iridium, rhodium, mercury, ruthenium, or osmium. In one embodiment the adsorbent contains less than 0.1 wt-%, and in another embodiment none, of the metal, based on the weight of the adsorbent. References herein to the Periodic Table are to the new notation of the Periodic Table of the Elements in the inside front cover of the CRC Handbook of Chemistry and Physics, $80^{th}$ Edition, 1999–2000, CRC Press, Boca Raton, Fla. The adsorbent may be a catalyst, such as a hydrocarbon conversion catalyst. The adsorbent may even have substantially the same composition as the catalyst particles that are used in the regeneration zone and any reaction zone. More than one adsorbent may be used. Multiple adsorbents may be combined into a composite material, or they may be used without compositing, such as in a physical admixture of two adsorbents.

In addition to reversibly adsorbing at least one halogen, the adsorbent may also reversibly adsorb water. Generally, water is present along with halogen in the regeneration effluent stream from which halogen is recovered. Generally, the conditions that result in reversible adsorption of halogen also result in reversible adsorption of water. However, the presence of water can affect, sometimes adversely, the adsorption of halogen, because water can compete with halogen for sites on the adsorbent.

The method disclosed herein is believed to be applicable to a wide range of catalytic hydrocarbon conversion processes and the regeneration of their catalysts, including aromatic isomerization, paraffin or olefin isomerization, paraffin dehydrogenation, and alkylation. Such catalysts typically contain a halogen, such as chlorine or fluorine. However, catalytic reforming is the most widely practiced hydrocarbon conversion process that uses catalyst regeneration and to which the method disclosed herein applies. Reforming catalysts typically contain chlorine. Catalytic reforming is described in U.S. Pat. No. 5,837,636.

The method disclosed herein is applicable to moving-bed regeneration zones, which may be associated with fixed- or moving-bed reaction zones. The regeneration zone can be any regeneration zone that produces a halogen-containing vent gas that can be routed to the adsorption zone. Suitable regeneration zones include zones for coke combustion, dispersion, halogenating, oxidation, drying, and reduction. These zones are well known to persons of ordinary skill in the art and need not be described herein in detail.

These regeneration zones typically perform catalyst regeneration by circulating a recycle gas through a bed of catalyst. A small stream of makeup gas is added to the recycle gas to replace components that are consumed during regeneration, and a small amount of vent gas is vented off to allow for the addition of the makeup gas. The steady addition of makeup gas and the venting of vent gas establishes a steady state condition that produces a nearly constant concentration of halogen. The recycle gas and the vent gas thus typically contain halogen, such as hydrogen chloride, molecular chlorine, and oxygenated compounds containing halogen along with carbon and/or hydrogen. The recycle gas and the vent gas also typically contain nearly constant concentrations of other components such as water and oxygen. The absolute levels of these components depend on the type of catalyst regeneration being carried out.

A common example of such catalyst regeneration is coke combustion. Coke could have accumulated on surfaces of the catalyst while it was in the hydrocarbon conversion reaction zone. If the recycle gas stream contains a low concentration of oxygen of typically from 0.5 to 1.5 vol-%, coke may be removed by combustion. Coke is comprised primarily of carbon but is also comprised of a relatively small quantity of hydrogen, generally from 0.5 to 10 wt-% of the coke. The mechanism of coke removal is oxidation to carbon monoxide, carbon dioxide, and water. The coke content of spent catalyst may be as much as 20% by weight of the catalyst weight, but from 5 to 7% by weight is a more typical amount. Coke is oxidized at gas inlet temperatures of the combustion catalyst bed ranging from about 316° to about 649° C. (600° F. to 1200° F.) in one embodiment, and from about 399° to about 566° C. (750° F. to 1050° F.) in another embodiment. Gas outlet temperatures of the combustion catalyst bed range from about 343° to about 677° C. (650° F. to 1250° F.) in one embodiment, and from about 427° to about 566° C. (800° F. to 1100° F.) in another embodiment. However, within the combustion catalyst bed temperatures in localized regions may reach more than 677° C. (1250° F.) or more. Because of these high temperatures and also because of high water concentrations, catalyst halogen is quite readily removed from the catalyst during coke combustion. The presence of the halogen in the combustion recycle gas can help to prevent too much catalyst halogen from being stripped away, and can also help prevent the catalyst metal from agglomerating. Coke combustion consumes oxygen, so a small stream of makeup gas is added to the combustion recycle gas to replace the consumed oxygen, and a small amount of vent gas is vented off to allow for the addition of the makeup gas. The operating variables that affect the water concentration of the combustion recycle gas are described in U.S. Pat. No. 5,001,095 (Sechrist) and U.S. Pat. No. 5,376,907 (Sechrist), the teachings of which are hereby incorporated herein by reference.

Another example of catalyst regeneration is dispersion (or redispersion) of the catalyst metal. The recycle gas that is employed in dispersion generally contains a higher concentration of oxygen than for coke combustion, usually from 2 to 21 vol-%. The dispersion recycle gas also generally contains halogen either as molecular halogen such as molecular chlorine or a halogen-containing component that can be converted in the inlet or within the dispersion catalyst bed to molecular halogen. The halogen is generally introduced in a small stream of carrier gas that is added to the dispersion recycle gas, and so a small amount of vent gas is vented off to allow for the addition of the carrier gas. Although the actual mechanism by which molecular halogen such as chlorine disperses catalyst metal is the subject of a variety of theories, it is generally recognized that the metal may be dispersed without necessarily increasing the catalyst halogen content. Catalyst metal is dispersed at gas inlet temperatures of the dispersion catalyst bed ranging from about 370° to about 650° C. (698° F. to 1202° F.) in one embodiment, and from about 425° to about 593° C. (797° F. to 1100° F.) in another embodiment. Gas outlet temperatures of the dispersion catalyst bed range from about 370° to about 649° C. (698° F. to 1200° F.) in one embodiment, and from about 425° to about 593° C. (797° F. to 1100° F.) in another embodiment.

A third example of a catalyst regeneration zone that circulates a recycle gas and withdraws a vent gas is halogenating or rehalogenating—most commonly chloriding— of the catalyst. Although the chloriding recycle gas must contain chlorine or chloride, the chloriding recycle gas generally does not require the presence of oxygen unless it is needed to decompose the chlorine or chloride-containing material in order to deposit chloride on the catalyst. The chlorine or chloride-containing material is generally introduced in a small stream of carrier gas that is added to the chloriding recycle gas, and so a small amount of vent gas is vented off to allow for the addition of the carrier gas. Halogenation conditions are generally similar to those of dispersion.

A fourth regeneration step is oxidation of the catalyst metal. This often takes place at least to some extent during one or more of the previously mentioned steps of coke combustion, dispersion, and halogenation, although it can also occur separately. Oxidation conditions such as temperature are generally similar to those of dispersion or halogenation, except that the temperature and/or the oxygen concentration during oxidation may be higher. Also, oxidation agents other than molecular oxygen, such as ozone, can be used.

A fifth example of catalyst regeneration is drying to remove water from the catalyst. The effluent gas of the drying zone typically contains water. Essentially any dry gas that does not adversely affect the catalyst can be used to dry the catalyst. Air, oxygen, or nitrogen are typically used. Although recycling a portion of the effluent gas reintroduces already-removed water to the drying zone, recycling increases the space velocity of the gas that contacts the catalyst. Provided that some of the water removed from the catalyst is ultimately vented, this recycling can promote catalyst drying. A stream of makeup gas is added to the drying recycle gas to compensate for the withdrawal of the vent gas. Drying by contacting of the catalyst with a hot gas removes not only water but also halogen from the catalyst. Catalyst is dried at gas inlet temperatures of the drying catalyst bed ranging from about 425° to about 650° C. (797° F. to 1202° F.) in one embodiment, and from about 480° to about 593° C. (896° F. to 1100° F.) in another embodiment. Gas outlet temperatures of the drying catalyst bed range from about 425° to about 650° C. (797° F. to 1202° F.) in one embodiment, and from about 480° to about 593° C. (896° F. to 1100° F.) in another embodiment.

A final example of regeneration is reduction of the catalyst metal. Reduction is described in U.S. Pat. No. 6,117,809, the teachings of which are incorporated herein by reference. Reduction can take place in a gas recirculation zone, typically using a suitable gas such as a hydrogen-rich gas. By hydrogen-rich, it is meant a gas having a concentration of hydrogen of greater than 50 mol-%. The reduction gas may have a hydrogen concentration of 5–100 mol-%, with the balance being $C_1$–$C_5$ hydrocarbons. Catalyst metal is reduced at gas inlet temperatures of the reduction catalyst bed ranging from about 149° to about 538° C. (300° F. to 1000° F.) in one embodiment, and from about 371° to about 510° C. (700° F. to 950° F.) in another embodiment. Gas outlet temperatures of the reduction catalyst bed range from about 177° to about 566° C. (350° F. to 1050° F.) in one embodiment, and from about 399° to about 538° C. (750° F. to 1000° F.) in another embodiment. However, within the reduction catalyst bed temperatures in localized regions may reach more than 677° C. (1250° F.) or more. Reduction of the catalyst metal typically generates water, and a vent gas containing water and other byproducts of reduction is withdrawn from the recirculating gases. The reduction gas attains steady state concentrations of water and halogen.

The majority of the following description of the method disclosed herein is presented in terms of adsorption of halogen from a vent gas stream of a coke combustion section of a reforming catalyst regeneration zone because this is believed to be the most common application of this invention. However, this description is not intended to limit the scope of this invention as set forth in the claims. The catalyst particles in the coke combustion bed of the regeneration zone can be contained in an elongated bed having two elongated sides. In such an arrangement, the two elongated sides are open for transverse gas flow through the catalyst bed. Catalyst particles move axially along the bed by withdrawing catalyst particles depleted in coke deposits by combustion from the outlet end of the bed and adding catalyst particles containing coke deposits to the inlet end of the bed. The coke content of the catalyst leaving the combustion bed may be 0.01% by weight of the catalyst weight or less, but generally it is approximately 0.2% by weight or less.

Generally, the makeup gas to the combustion section of a reforming catalyst regeneration zone comprises air and most of the oxygen in the makeup air is consumed in the combustion of coke. Therefore, the vent gas generally, contains from 70 to 80 mol-% nitrogen, from 10 to 20 mol-% carbon oxides, which is mainly carbon dioxide with trace amounts of carbon monoxide, and from 0.2 to 2.0 mol-% oxygen. Oxygen might, however, not be present in the vent gas stream if all of the oxygen is consumed in the combustion of coke in, for example, a multistage combustion zone. While nitrogen, carbon oxides, and oxygen are typical but not required components of the vent gas stream that is passed to the adsorption zone, the vent gas stream must contain halogen such as hydrogen chloride or chlorine. The concentration of hydrogen chloride in the vent gas stream to the adsorption zone is generally from 50 to 10000 mol-ppm. The concentration of chlorine in the vent gas stream to the adsorption zone is generally from 1 to 500 mol-ppm. Water may also be present in the vent gas stream. The concentration of water in the vent gas stream to the adsorption zone is generally from 1 to 20 vol-%. Water competes with halogens for adsorption on the catalyst particles in the adsorption zone. The vent gas stream may also contain trace amounts of other volatile halogens such as chlorinated hydrocarbons and chlorinated metals.

Sulfur, in the form of sulfur oxides such as sulfur dioxide and sulfur trioxide, is often present in the vent gas stream. Hydrocarbon feedstocks are often contaminated with low concentrations of sulfur, some of which can adsorb or deposit on the catalyst in the reaction zone. When catalyst containing sulfur enters a regeneration zone, the sulfur is typically converted to sulfur dioxide and trace amounts of sulfur trioxide, which appear in the vent gas. These sulfur oxides can harm the performance of the catalyst by forming sulfates on the catalyst or by agglomerating the platinum metal. In order to avoid these harmful effects, it is preferred that the sulfur concentration of the hydrocarbon feedstock be maintained as low as possible in order to minimize the presence of the sulfur oxides in the vent gas.

When using the method disclosed herein, a portion of the vent gas stream is passed to an adsorption bed that uses the adsorbent in an adsorbent bed to remove halogen from the vent gas. Although the adsorbent could have the same composition as the catalyst that is being regenerated, that is not a requirement of the method disclosed herein. When the catalyst contains specially selected chemical components and or has select physical properties that are not useful for the adsorption of halogen, using the catalyst as the adsorbent may be an inefficient use of the catalyst. On the other hand, when the catalyst contains a support or base that can adsorb halogens and spare quantities of the catalyst are readily available, it may be convenient to use the catalyst in the adsorbent bed. Whether or not the catalyst is used as the adsorbent, the adsorbent is typically in a bed separate from the bed of catalyst being regenerated. Unlike the catalyst that is being regenerated, the adsorbent does not pass through the regeneration zone. The method disclosed herein uses this separate adsorbent to adsorb the halogen from the vent gas stream and to desorb halogen for return to catalyst being regenerated.

The adsorbent is alternately used for adsorption and desorption. The adsorbent-containing beds can be any of the well-known arrangements for contacting solid particles with a gas stream. The contacting arrangement must be suitable for adsorbing halogens from the gas stream onto the adsorbent and/or for desorbing halogens from the adsorbent into a gas stream. Adsorption and desorption can be performed in a fixed bed, with each fixed bed alternately being contacted with a gas stream for adsorption and for desorption. The adsorbent bed can also comprise a fluidized bed or a moving bed, with the adsorbent moving from a volume where adsorption occurs, to a volume where desorption occurs, and back. If the adsorbent bed is not a fixed bed, the direction of the gas flow is preferably countercurrent relative to the direction of movement of the adsorbent, but the direction of gas flow can also be cocurrent, crosscurrent, or a combination of countercurrent, cocurrent, and crosscurrent. The shape of the adsorbent bed can be rectangular, annular, spherical, or any suitable shape, but the preferred shape is cylindrical. The distributor for the gas flow to the catalyst bed may be of any suitable type, such as a pipe distributor or an annular distributor.

Figure 2:
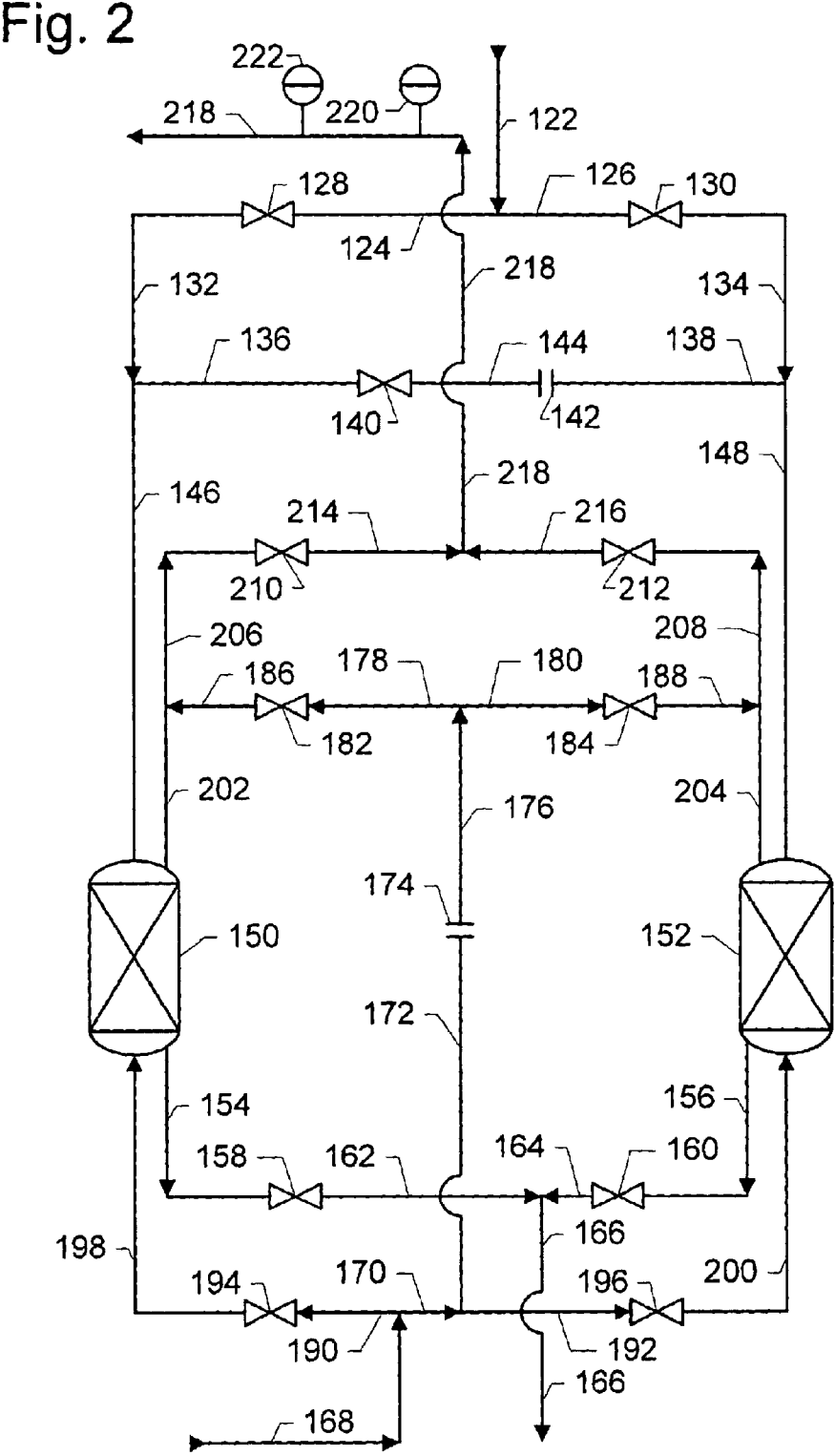

FIGS. 1 and 2 illustrate a stacked arrangement of reactors, a regenerator, and an adsorption/desorption zone for removing halogens from the regenerator vent gas and returning these halogens to the regenerator. For simplicity in describing FIGS. 1 and 2, the vent gas will be described as containing chlorine and hydrogen chloride.

Starting with FIG. 1 and the movement of catalyst, line 10 supplies catalyst particles containing an oxidized metal to nonmechanical valve 12. Hydrogen enters valve 12 through line 14 at a rate that regulates the transfer of catalyst particles through valve 12 into line 18. Valve 12 can take on well-known forms such as an L valve, J valve, or K valve. Further information on nonmechanical valves can be found in U.S. Pat. No. 5,837,636 and the references incorporated therein. As catalyst particles enter line 18, more hydrogen enters the bottom of line 18 through line 16 and transports the catalyst particles upwardly through line 18 to the top 20 of stacked reactor arrangement 22, which the particles and lift fluid enter.

Catalyst particles flow from the top to the bottom of the stacked reactor arrangement 22. At the top 20, the catalyst particles pass first through a reduction zone, where hydrogen gas reduces the metal on the catalyst particles. From there the catalyst particles pass through multiple reactors where hydrocarbons contact the catalyst particles and coke is deposited on the catalyst particles. Details of the individual reactors and other internals of the stacked reactor arrangement 22 are well known. The stacked reactor arrangement 22 permits continuous or intermittent flow of the catalyst particles from the top 20 to lower retention chamber 24 at the bottom. Additional hydrogen enters chamber 24 through a line (not shown) at a rate that purges hydrocarbons from the catalyst particles in chamber 24.

Catalyst particles containing coke deposits flow from chamber 24 and through line 26. In line 26, hydrogen and hydrocarbons are displaced from the catalyst particles to prevent any carry-over of hydrogen and hydrocarbons to regenerator 40. At the bottom of line 26, nonmechanical valve 28 transfers catalyst particles upwardly through line 34. Nitrogen enters valve 28 through line 30 and additional nitrogen enters the bottom of line 34 through line 32.

Catalyst particles pass through line 34 into disengager 36. Disengagers are well known. Nitrogen enters disengager 36 through a line (not shown) at a rate that separates broken or chipped catalyst particles and catalyst fines from the whole catalyst particles. The catalyst chips and fines exit through another line (not shown) for collection. The whole catalyst particles flow from the bottom of disengager 36 through lines 38 to regenerator 40.

Lines 38 discharge catalyst particles into conduits 42 inside regenerator 40. Conduits 42 feed the catalyst particles to annular catalyst bed 48 formed by outer catalyst particle retention screen 46 and inner catalyst particle retention screen 52. Bed 48 is in coke combustion zone 50. Regenerator 40 is cylindrical in form, as are retention screens 46 and 52, which are concentric with regenerator 40. Screens 46 and 52 are perforated with holes that are large enough to allow gas to pass through bed 48 but do not permit the passage of catalyst particles therethrough. Outer screen 46 extends downward from lines 42 and is supported at its bottom and its top to keep it centered in regenerator 40. Inner screen 52 is attached to the top head of regenerator 40 and extends downward from there to a point slightly above the lower end of screen 46. The bottom of inner screen 52 is open to allow gas containing oxygen and chlorine to flow upward from cylindrical catalyst bed 58 to central section 54, as will be described hereinafter.

The bottom of bed 48 is open to allow catalyst particles to empty from bed 48 into bed 58. The catalyst particles in bed 58 are located in chlorination zone 60. Bed 58 is defined in part by annular baffle 56. Annular baffles are well known and disclosed in U.S. Pat. No. 4,662,081 (Greenwood); U.S. Pat. No. 4,665,632 (Greenwood); and U.S. Pat. No. 5,397,458 (Micklich et al.). Catalyst particles flow from bed 58 into the open volume between truncated conical baffle 72 and conical baffle 68, which is concentric with baffle 72. From there, the catalyst particles flow downwardly into an annular holdup zone 76 defined by a lower cylindrical portion 74 of baffle 72 and a lower cylindrical portion of baffle 68. The annular volume of catalyst particles retained between baffles 72 and 68 provides a gas seal to limit the flow of gases upwardly through the catalyst particles into bed 58. Catalyst particles flow from zone 76 into cylindrical catalyst bed 84. The catalyst particles in bed 84 are located in drying zone 80. Bed 84 is defined in part by annular baffle 79. The catalyst particles are periodically transferred from bed 84 by withdrawing a predetermined volume of catalyst through line 102 which in turn allows the catalyst particles to slump downward through the packed catalyst beds in disengager 36 and in zones 50, 60, and 80.

The catalyst particles exiting regenerator 40 through line 102 pass to nitrogen seal drum 104, through line 106, and to lock hopper arrangement 108. A line (not shown) may provide a location for introducing additional catalyst into the catalyst transport system via line 102. Seal drum 104 and lock hopper arrangement 108 control the transfer of catalyst particles back to stacked reactor arrangement 22. The nitrogen seal drum 104 and lock hopper arrangement 108 also displace oxygen gas from the catalyst particles to prevent any carry-over of oxygen to stacked reactor arrangement 22. Seal drum and lock hopper arrangements are well known to persons skilled in the art and may be used in any of their current, well-known forms to supply a flow of catalyst particles into line 10.

Looking now to the gas flows, recycle gas enters the coke combustion zone 50 through line 100. The recycle gas is distributed in annular chamber 44 that extends around screen 46 and is defined by screen 46 and the vessel wall of regenerator 40. An upper portion of screen 52 is impermeable to gas flow, or blanked off, to prevent gas flow from chamber 44 across the top of the regenerator 40. As the recycle gas passes through catalyst bed 48, oxygen is consumed in the combustion of coke and gas is collected in section 54. The process of combusting coke removes chloride from the catalyst particles, and therefore the gas collected in section 54 contains not only water and carbon dioxide but also chlorine and hydrogen chloride.

The gas that collects in section 54 includes not only gas from bed 48, but also gas containing oxygen, chlorine, and hydrogen chloride flowing upward from bed 58. Because the gas that collects in section 54 includes gas that will be vented from the coke combustion zone 50 as well as gas that will be recycled in the coke combustion zone 50, the gas is usually denoted "vent gas/recycle gas." The vent gas/recycle gas stream leaves section 54 and passes through line 86 to cooler 88. Cooler 88 uses any suitable cooling medium such as water or air, and removes some of the heat from the vent gas/recycle gas stream during normal operation. The cooled vent gas/recycle gas stream flows through line 90 and splits into two portions. One portion is recycled to the coke combustion zone 50 and is called the recycle gas stream. This portion is conveyed by line 92 to blower 94 and then passes through line 96 to heater 98. Heater 98 heats the recycle gas stream to carbon-burning temperatures during start-up and to a lesser degree adds heat to the recycle gas stream during normal operation. Heater 98 operates in conjunction with cooler 88 to regulate the heat content of the recycle gas stream. The recycle gas stream passes through line 100 and enters coke combustion zone 50.

The other portion of the cooled vent gas/recycle gas stream is called the vent gas stream and flows through line 110 to cooler 114. Cooler 114 cools the vent gas stream by indirect heat exchange with any suitable cooling medium such as water or air. The cooled vent gas flows through line 116 to pressure regulating valve 118. Pressure indicator-controller 112 measures the pressure in line 110 and generates signal 120. Signal 120 is representative of the difference between the actual pressure and the desired pressure in line 110. Signal 120 regulates the extent of opening of valve 118. The desired pressure in line 110 is set in order to maintain a target pressure in one of the zones of the regenerator 40, usually the coke combustion zone 50. After being cooled and depressured, the vent gas stream is at the desired gas inlet temperature for adsorption and flows through line 122 to adsorption/desorption zone 123.

A better understanding of adsorption/desorption zone 123 can be obtained from FIG. 2. Lines 122, 166, 168, and 218 have the same functions and item numbers in FIGS. 1 and 2. Zone 123 comprises two beds 150 and 152 and the other lines, the valves, and the other equipment shown in FIG. 2. Beds 150 and 152 contain an adsorbent such as alumina. Bed 150 operates in adsorption mode and bed 152 operates in desorption mode. The vent gas stream in line 122 flows through line 124, valve 128, line 132, and line 146, and enters bed 150. The adsorbent in bed 150 adsorbs at least some of the chlorine and hydrogen chloride from the vent gas. The adsorption effluent gas flows through line 154, valve 158, and line 162, and the effluent is discharged from zone 123 through line 166. If desired, this effluent can be sent to conventional facilities (not shown) to neutralize any residual chlorine or hydrogen chloride that may be present in the effluent. However, one of the advantages of the method disclosed herein is that the residual chlorine and hydrogen chloride content is so relatively low that the need for such an additional neutralization step is often eliminated.

Line 232 supplies makeup air to coke combustion zone 50. This makeup air is introduced, however, initially to drying zone 80, from which most of the oxygen in the makeup air ultimately makes its way to coke combustion zone 50. Air from line 232 is added to regenerator 40 at a rate of addition generally equal to the rate of vent gas in line 110. Air in line 232 is dried in drier 234 and then passes through line 236 to heater 238, which raises the temperature of the air stream to about 566° C. (1050° F.). The heated, dry air stream passes through line 240 to drying zone 80. The air stream enters annular space 82, which is defined by annular baffle 79 and the vessel wall of regenerator 40. Annular baffle 79 is used to uniformly distribute the air through bed 84. Other suitable distributors such as pipe distributors and conical baffles may be used. Contacting the catalyst in bed 84 with the heated, dry air removes water from the catalyst.

Drying bed effluent gas, which is mostly air now laden with water, exits the top of bed 84. Pressure drop provided by zone 76 forces the majority of the upward flowing gas into annular space 78, which is defined by the vessel wall of regenerator 40, baffles 72 and 74, and partition 70. Most of the water-laden effluent gas flows through line 168 to zone 123 to be used for desorption. The gas in line 168 flows through line 170, line 192, valve 196, and line 200, and enters bed 152. The adsorbent in bed 152 contains chloride, which is desorbed and exits as hydrogen chloride and chlorine with the effluent of bed 152. A portion of the gas flowing through line 200 may be made to bypass bed 152 through a bypass line (not shown). Bed 152 effluent flows through line 204, line 208, valve 212, line 216, line 218, and line 226 to heater 228. Heater 228 heats the gas to the desired gas inlet temperature, and the gas flows through line 230 and enters chlorination zone 60. Flow indicator 220 measures the flow rate of the effluent in line 218, and analyzer 222 measures the concentrations of chlorine and hydrogen chloride in the effluent in line 218. These measurements of flow rate and concentrations allow computation of the quantities of chlorine and hydrogen chloride per unit time carried by the bed 152 effluent to chlorination zone 60. If the rate of chlorine or hydrogen chloride is too low for the requirements of the chlorination zone 60, additional chlorine-containing materials such as a chlorinated paraffin can be added to line 218 through line 224.

The gas that contacts the catalyst in bed 58 comprises a mixture of gas flowing through line 230 and gas flowing upward from annular space 78. This mixture is formed in a two-pass baffle system 69 before entering the bottom of bed 58. Baffle system 69 is known and disclosed in U.S. Pat. Nos. 5,397,458 and 5,498,756, the contents of which are hereby incorporated herein by reference. Partition 70 is a flat plate, which may be solid and impermeable to gas flow or alternatively may define a plurality of restriction orifices that allow gas to flow through partition 70. When present, the restriction orifices are sized to produce a pressure drop for flow passing through partition 70. The pressure drop induces most of the gas flow from space 78 to flow through zone 123 and to enter space 62 via line 230. When the restriction orifices are not present, partition 70 functions as a barrier to gas flow, forcing even more of the gas flow out to zone 123. If needed, a compressor or blower (not shown) can be placed anywhere in line 168, zone 123, line 218, or line 226 to force this gas flow through zone 123. When the restriction orifices are present, the remainder of the gas flow from space 78 enters space 62 through partition 70. If the pressure drop is suitable, the previously mentioned chlorine-containing materials added into line 218 through line 224 may instead be introduced directly into space 62. Space 62 is defined by upper cylindrical portion 66 of baffle 72, partition 70, baffle 56, and the vessel wall of regenerator 40. Cylindrical portion 66 is concentric with annular baffle 56. From space 62 the mixture of gases flows into space 64 defined by cylindrical portion 66 and annular baffle 56. From space 64, the gases enter the bottom of bed 58.

Although not shown in FIG. 1, the preferred form of injecting the gas flowing through line 230 into space 62 involves a pipe connection at the end of line 230 extending into space 62, preferably in the form of a "T". Cylindrical portion 66 directs the flow of this gas in a circumferential direction that is perpendicular to the upward direction of the jets of gas formed by the restriction orifice openings in partition 70. Injecting the gas flowing in line 230 in a direction perpendicular to the jets creates turbulence that enhances the initial mixing of the gases to provide a more well-distributed and uniform gas flowing through space 64 and into bed 58.

Prior to being placed in adsorption mode, bed 150 operated in desorption mode. While bed 150 was in desorption mode, the chloride on the adsorbent was desorbed and passed to chlorination zone 60 through line 218. This desorption depleted the adsorbent in bed 150 of chloride, and thereby prepared the adsorbent in bed 150 for use in adsorption mode. FIG. 2 provides an understanding of how bed 150 operated in desorption mode. The gas in line 168 flowed through line 190, valve 194, and line 198, and entered bed 150. The adsorbent in bed 150 contained chloride, which was desorbed and exited with the effluent of bed 150. Bed 150 effluent flowed through line 202, line 206, valve 210, and line 214, and into line 218.

Conversely, prior to being placed in desorption mode bed 152 operated in adsorption mode. While bed 152 was in adsorption mode, the chlorine and hydrogen chloride from the vent gas stream were adsorbed on the adsorbent. This adsorption added chloride to the adsorbent in bed 152, and thereby prepared the adsorbent in bed 152 for use in desorption mode. When bed 152 was in adsorption mode, the vent gas stream in line 122 flowed through line 126, valve 130, line 134, and line 148, and entered bed 152. The adsorbent in bed 152 adsorbed some of the chlorine and hydrogen chloride from the vent gas. The adsorption effluent gas flowed through line 156, valve 160, and line 164, before being discharged through line 166.

If the pressure used for removing halogen from the vent gas stream is less than the pressure used for removing halogen from the adsorbent, then a bed that has been used for removing halogen from the vent gas stream should be pressured up to prior to removing halogen from the bed. A convenient gas source for this pressuring step is the gas that is being used for removing halogen from the bed. In the case of pressuring bed 152, valve 184 is opened so that this gas may flow from line 168, through lines 170 and 172, through restriction orifice 174, through lines 176 and 180, through valve 184, through lines 188 and 204, and into bed 152. In the case of pressuring bed 150, valve 182 is opened so that the gas flows from line 168, through lines 170 and 172, through orifice 174, through lines 176 and 178, through valve 182, through lines 186 and 202, and into bed 150. Orifice 174 is sized to set a gas flow rate corresponding to a desired pressuring rate.

After halogen has been removed from an adsorbent bed, and if the pressure used for removing halogen from the vent gas stream is less than the pressure for removing halogen from the adsorbent bed, that adsorbent bed should be depressured prior to being placed in adsorption mode. A convenient destination for the gas released during depressuring is a bed that is being used for adsorption, since the released gas may contain halogen. In the case of depressuring bed 150, valve 140 is opened so that gas flows from bed 150, through lines 146 and 136, through valve 140, through line 144, through restriction orifice 142, through lines 138 and 148, and into bed 152. In the case of depressuring bed 152, valve 140 is opened so that gas flows from bed 152, through lines 148 and 138, through orifice 142, through line 144, through valve 140, through lines 136 and 146, and into bed 150. Orifice 142 is sized to set a gas flow rate corresponding to a desired depressuring rate.

The operating conditions for adsorption and desorption are determined by many factors, but a primary factor is the regeneration conditions. The coke combustion conditions for bed 50 usually include a gas inlet temperature, an inlet gas hourly space velocity, an inlet oxygen concentration, and an inlet molar ratio of water to halogen (e.g., chloride) of the gases flowing in line 100, a peak or maximum temperature of bed 48, and an outlet temperature of the gases flowing in line 86. In practice, when the halogen is chlorine the molar ratio of water to halogen is the molar ratio of water to chloride. Of course, the specific target values of each of these combustion variables depends on the composition and nature of the catalyst being regenerated, and on the process and mechanical details of the regenerator 40 and other associated equipment (such as exchanger 88, blower 94, and heater 98). A person of ordinary skill in the art is able to determine the values of these coke combustion variables.

Similarly, the chlorination conditions for bed 58 usually include a gas inlet temperature, an inlet gas hourly space velocity, an inlet oxygen concentration, and an inlet molar ratio of water to halogen of the gases flowing in space 64, and a peak or maximum temperature of bed 58. The composition and conditions (e.g., temperature) of the gas flowing in space 64 depends on the flow rates, compositions, and conditions, of the gas flowing from space 78 upward through partition 70 and of the gas flowing through line 230. Again, the specific target values of each of these chlorination variables depends on the composition and nature of the catalyst being regenerated, on the process and mechanical details of regenerator 40 and other associated equipment (such as heater 228). A person of ordinary skill in the art is able to determine the values of these chlorination variables.

The desired gas inlet conditions of bed 58 may or may not be the same, or substantially the same, as the outlet conditions of bed 152 undergoing desorption. Since the flow rate of the gas stream flowing in line 218 is a relatively large fraction of the flow rate of the gas stream flowing in space 64, changes in the composition and outlet conditions of the stream flowing in line 218 have a relatively large effect on the gas inlet conditions of bed 58. Nevertheless, the desorption outlet conditions may be such that the gas flowing in line 218, when combined with the gas flowing through partition 70, provides the desired inlet conditions for bed 58. In that case, there would be neither heat exchange by heater 228, nor halogen addition through line 224. To achieve those, or any of the possible outlet conditions for bed 152 without undue experimentation, a person of ordinary skill in the art can monitor the desorption conditions and adjust the inlet conditions of bed 152 as necessary. The gas inlet temperature of bed 152 is set in large part by heater 238, and the drying gas outlet temperature is typically from 371° to 593° C. (700° to 1100° F.). A supplemental heater or cooler (not shown) can be placed anywhere in line 168 or in zone 123 upstream of bed 152. Generally, the desorption temperature is higher than the adsorption temperature and above about 66° C. (150° F.). The desorption temperature is usually from about 260° C. (500° F.) to about 538° C. (1000° F.). The inlet gas hourly space velocity to bed 58 is set by controlling the flow rate of makeup air through line 232. The inlet oxygen concentration to beds 152 and 58 is that of the makeup air in line 138. That concentration is usually 21 mol-%, but oxygen-enriched or oxygen-depleted air may also be used. The inlet molar ratio of water to halogen is preferably extremely high (i.e., little or no halogen in the inlet gas), since any halogen in the inlet gas to bed 152 would deter desorption. Such low halogen concentrations (from about 1 to about 1000 mol-ppm hydrogen chloride and from about 0.1 to about 100 mol-ppm chlorine) are typical of gases exiting drying beds, such as bed 84.

With bed 152 in desorption mode, the outlet conditions of bed 152 will change over time. This might happen because the adsorbent in bed 152 has become depleted of halogen, resulting in a gradual and ultimately unacceptable increase in the molar ratio of water to halogen in the desorption outlet gas. The measurements of flow indicator 220, analyzer 222, and a water analyzer (not shown) in line 218 can be used to monitor this increase. When the molar ratio of water to halogen becomes too high, the positions of bed 152 and bed 150 may be switched, so that bed 152 is used for adsorption, and bed 150 is used for desorption.

The duration of time that a bed of adsorbent is in desorption mode and the frequency at which the bed is switched from desorption mode depends on many factors. These factors include the desorption conditions, the type and amount of adsorbent, the type of halogen, the residual or minimum capacity of the adsorbent for halogen at desorption conditions, the halogen content of the adsorbent, the molar ratio of water to halogen in the stream entering the bed of adsorbent, and the halogen concentration in the effluent of the bed of adsorbent. For an adsorbent bed in desorption mode, the halogen content in the bed inlet stream is usually less than the halogen concentration in the bed effluent stream by at least 1%, and more commonly at least 10%, of the halogen content in the bed effluent stream. The halogen content in the bed effluent stream is usually from about 100 to about 10000 vol-ppm greater than the halogen concentration in the bed effluent stream. As less and less halogen is desorbed from a bed of adsorbent, the bed is eventually removed from desorption mode and another bed takes its place in desorption mode.

It may be desirable to extend the time that a bed of adsorbent is in desorption mode while still maintaining the outlet conditions of that bed constant or substantially constant. One possible way of simultaneously achieving these two objectives is to add water (or a compound that forms water after being added, such as an alcohol) to the gases that enter the bed 152. Water in the inlet gases to bed 152 helps desorb halogen from the adsorbent, and this is beneficial when the halogen content of the bed effluent stream of bed 152 declines as bed 152 becomes depleted of halogen. Although the point of water introduction to the process could be anywhere in or downstream of line 168 and upstream of bed 152, it is preferred to add water at a point where the process temperature is relatively high, such as downstream of any supplemental heater in line 168.

Another way of not only extending the time that a bed of adsorbent is in desorption mode but also maintaining substantially constant outlet conditions of the bed is to use two beds containing adsorbent in a parallel flow arrangement for desorption. Initially, only one bed of adsorbent is being desorbed, and all of the inlet gas for desorption flows to that one bed. However, as that adsorbent bed becomes depleted of halogen, the halogen content in that bed's effluent declines. When the composition of that bed's effluent stream is no longer the same, or substantially the same, as the desired composition of the regeneration zone inlet stream, a second bed of adsorbent is placed in a parallel flow arrangement with the first bed, and some of the inlet gases for desorption are routed to the second bed. While both beds are being desorbed, the flow rate of the inlet gas for desorption to the two beds is split so that a greater portion of the gas flows to the first, more-depleted bed and a smaller portion of the gas flows to the second, less depleted bed. In this way, the increase in halogen contributed by desorption of the second bed makes up for the decline in halogen contribution from the first bed, so that the total amount of halogen to catalyst bed 58 is constant. Accordingly, the first bed of adsorbent may remain in desorption mode for a longer period of time than it could have remained if it alone was used to achieve the desired inlet conditions of the regeneration zone. When the first adsorbent bed is sufficiently depleted of halogen, the second adsorbent bed is positioned to function as the first adsorbent bed had functioned, and a third adsorbent bed replaces the second adsorbent bed. The third adsorbent bed functions as the second adsorbent bed had functioned.

The adsorption conditions are generally selected in order to recover a target or desired fraction of the total amount of the halogen that flows in line 122. In the embodiment shown in the drawing, that total amount of halogen is equal to the amount of halogen that enters the bed 150 in line 146, and the amount of halogen that is lost (i.e., not recovered) is the amount of halogen in the gas stream that exits the bed 150 and then exits the process in line 166. Since the flow rates and halogen concentrations of the streams entering and leaving bed 150 may vary with time, halogen recovery is determined by time-averaging the amount of halogen entering and exiting the bed 150. Thus, the amount of halogen entering the bed 150 can be computed by measuring the flow rates and halogen concentrations of the inlet stream at specified times, plotting a curve representing the product of each flow-rate-concentration data pair versus time, and then integrating the area under the curve. The amount of halogen leaving the bed 150 can be computed in a similar way, and the halogen recovery is the quotient of the amount leaving divided by the amount entering, expressed as a percentage and subtracted from 100%. Halogen recovery is generally greater than about 80 wt-% and preferably greater than about 90 wt-%.

The vent gas stream that enters the bed being used for adsorption typically contains from 50 to 10000 mol-ppm hydrogen chloride and from 1 to 500 mol-ppm chlorine. The vent gas stream enters cooler 114 at typical catalyst regeneration temperatures of from about 371° to about 538° C. (700° to 1000° F.). Most of the cooling occurs in cooler 114 but some additional cooling may occur as a result of depressuring the vent gas stream across valve 118. The inlet temperature of the gas entering a bed in adsorption mode is typically at from about 149° to about 260° C. (300° to 500° F.). If the temperature of the adsorbent in a bed that is placed in adsorption mode is initially different from the inlet temperature of the gas, the adsorbent temperature will rise or fall. Therefore, after some period of contacting the temperature at which adsorption occurs will usually be within the range of from about 149° to about 260° C. (300° to 500° F.). In order to minimize the possibility of corrosion due to condensation of droplets of hydrochloric acid from the vent gas stream, in one embodiment the exit temperature of cooler 114 is not below the dew point of the vent gas stream. The adsorption pressure is from about atmospheric pressure to about 1724 kPa(g) (250 psi(g)).

The halogen recovery is determined by many factors. The molar ratio of water to halogen of the inlet gas to bed 150 certainly affects the recovery, but this operating variable is not one that a person of ordinary skill in the art practicing the method disclosed herein would typically control. This is because this ratio is essentially the same as that of the vent gas exiting regenerator 40, which in turn is determined in large part by the previously-mentioned inlet conditions to coke combustion zone 50 and bed 48 and by the regeneration reactions that take place in regenerator 40. Generally, as the molar ratio of water to halogen increases, halogen recovery decreases. The molar ratio of water to hydrogen halide in the stream entering the adsorbent bed being used for adsorption is usually more than about 5:1, and depending on the catalyst being regenerated in the reactor as well as other factors, this molar ratio could conceivably be as high as about 50:1 or 100:1.

A second factor affecting halogen recovery is the halogen content of the adsorbent at the start of the adsorption step. Generally, as the initial halogen content increases, the halogen recovery decreases. This initial halogen content is the same as the final halogen content of the adsorbent used for desorption, since the bed of adsorbent that is used for adsorption had previously been used for desorption. For this reason, the extent to which halogen is desorbed during the desorption step can influence the halogen recovery in the adsorption step. But, for the same reason, this variable cannot be independently controlled once the desorption step has finished and the adsorption step has begun.

A third variable that can be independently adjusted to affect halogen recovery during adsorption is the adsorption temperature. Adsorption temperature can be controlled by regulating mainly exchanger 114 and to a lesser extent exchanger 88. Generally, recovery increases as adsorption temperature decreases. Thus, if during adsorption, the halogen recovery drops below the desired target, the adsorption temperature may be decreased to the low end of the range of adsorption temperatures.

The operating temperature for adsorption mode is generally lower than that for desorption mode. The adsorption temperature is usually above about 66° C. (150° F.). The adsorption temperature is usually no higher than the gas outlet temperature of coke combustion zone 50, but usually it is lower than that by at least about 55° C. (100° F.) due to heat exchange between the outlet of regenerator 40 and the inlet of bed 150. Only rarely would the adsorption temperature exceed about 482° C. (900° F.). The adsorption temperature is generally maintained above the dew point temperature of the vent gas in order to minimize the possibility of condensing corrosive acidic liquid in the adsorption equipment. Also, the adsorption temperature is preferably maintained above the capillary condensation temperature of the vent gas, which is the temperature at which condensation from the vent gas occurs in the capillaries of the adsorbent. The capillary condensation temperature is usually higher than the dew point temperature of the bulk vent gas.

The capillary condensation temperature depends on many factors, including not only the composition of the vent gas but also the chemical and physical properties of the adsorbent, such as the distribution of pore size and volume. When there are differences in the physical dimensions and chemical components of individual pores of the adsorbent, capillary condensation will occur over a range of temperatures. The greater the amount of capillary condensation during adsorption, the greater is the amount of water present on the adsorbent at the start of the desorption step. To the extent that this greater amount of water is desorbed during the desorption step, the greater is the amount of water withdrawn from the regenerator and returned or recycled to the regenerator. Conversely, as less water is adsorbed on the adsorbent during the adsorption step, more of the water simply passes through the adsorbent bed that is operating in adsorption mode, leading to a dryer adsorbent bed at the start of the desorption step.

The capillary condensation temperature can be approximately determined from a graph of the weight of water adsorbed on the adsorbent as a function of adsorption temperature of the vent gas. As temperature is decreased from above the range of capillary condensation temperatures into the range of temperatures where capillary condensation occurs, the slope of the graph increases dramatically. While the change in slope may occur over a range of temperatures rather than at one particular temperature, the change is nevertheless apparent to a person of ordinary skill in the art. For example, if the upper end of the range of capillary condensation temperature is 149° C. (300° F.), the change in the weight of water adsorbed may be only about 1.5 wt % as the temperature is decreased from about 427° C. (800° F.) to about 149° C. (300° F.), but may be about 4 wt-% as the temperature is further decreased from about 149° C. (300° F.) to about 121° C. (250° F.). In addition, a person of ordinary skill in the art can estimate the capillary condensation temperature by estimating the difference between the dew point temperature of the bulk vent gas and the capillary condensation temperature using well-known correlations and theoretical techniques. These techniques take into account the dimensions of the adsorbent's capillaries and other factors, and then adding that difference to the measured dew point temperature.

Despite decreasing the adsorption temperature to increase halogen recovery, halogen recovery may nevertheless be unacceptably low, because of frequent or excessive breakthrough of halogen into the outlet of the bed 150. In this case, other embodiments of the method disclosed herein can be used to further improve halogen recovery. Instead of, or subsequent to, operating the bed 152 so that the outlet conditions of bed 152 are maintained the same as, or substantially the same, the desorption operating variables may be selected more independently of the chlorination conditions. In these other embodiments of the method disclosed herein, desorption operating conditions are selected with the objective of decreasing the final halogen content of the adsorbent at the end of the desorption step. This objective can be met in several ways. First, the desorption temperature can be increased to a temperature above the desired gas inlet temperature of the chlorination bed. A supplemental heater (not shown) can heat the gases entering bed 152, and a supplemental cooler (not shown) can cool the exiting gases to the desired temperature for combining with the gases flowing through partition 70 and achieving a desired gas inlet temperature of bed 58. Second, the desorption step can be prolonged beyond the point when the outlet molar ratio of water to halogen increases above that which is desired. In that case, line 224 may be used to add halogen to the gases flowing in line 218, thereby lowering the molar ratio to the desired range for the inlet of bed 58.

Even if halogen recovery is within the desired range, the outlet conditions of bed 152 may not be what is desired for mixing the stream flowing in line 230 with the gas flowing upward through partition 70 to achieve the desired inlet conditions of bed 58. For example, the molar ratio of water to halogen in the gases flowing through line 204 may be lower than desired to attain a given molar ratio at the inlet of chlorination zone 60. This can happen if too much halogen is being desorbed too rapidly from the bed 152, such as when desorption is starting on a bed of adsorbent that adsorbed an excessive amount of halogen or when the gas is flowing through the bed at an excessive rate. In these situations, a surge of halogen may be desorbed from the bed, resulting in an unacceptably low molar ratio of water to halogen in the gases flowing through line 204. In these circumstances, either or both of two other embodiments of the method disclosed herein are useful. First, a line (not shown) may be used to add water to the gases flowing through line 218, thereby raising the molar ratio to the desired range for the inlet of bed 58. Second, a valve (not shown) in a bypass line (not shown) around bed 152 may be opened to bypass bed inlet gases around bed 152, thereby decreasing the amount of halogen that is desorbed from the adsorbent in bed 152 and effectively raising the molar ratio of the gases flowing through line 218 to the desired range. In either event, once the molar ratio of water to halogen in the gases flowing through line 218 increases to the desired range, the water addition or the gas bypassing may be decreased or stopped.

When halogen breakthrough occurs in the effluent of the bed of adsorbent that is being used for adsorption, the bed is removed from adsorption mode, and is subsequently used for desorption. The duration of time that the bed is in adsorption mode and the frequency at which the bed is removed from adsorption mode depends on many factors. These factors include the adsorption conditions, the type and amount of adsorbent, the type of halogens, the maximum capacity of the adsorbent for halogen at adsorption conditions, the halogen content of the adsorbent, the molar ratio of water to halogen in the stream entering the bed of adsorbent, and the halogen concentration in the adsorbent bed. A bed of adsorbent used in adsorption mode adsorbs usually at least 90 wt-%, and preferably at least 99 wt-%, of the halogen in the stream entering the bed of adsorbent. If less halogen than that is adsorbed by the bed of adsorbent, the bed is removed from adsorption mode and replaced with another bed.

Although the description of the method disclosed herein has been mainly in terms of two beds of adsorbent, one in use for adsorption and the other in use for desorption, there may of course be more beds of adsorbent, and at any given time some of these other beds might be in use for adsorption, desorption, or neither. One or more beds of adsorbent may have already been used for adsorption and are awaiting desorption, while others have been used for desorption and are awaiting adsorption. Such additional adsorbent beds may be desirable for several reasons. First, one or more additional beds may be useful if there is a heating step between the adsorption and desorption steps, to preheat the relatively cool adsorbent after adsorption and prior to desorption. Also, additional beds may be used if there is a cooling step after desorption and prior to adsorption. Third, additional beds may be used if the adsorbent beds have a relatively small capacity for halogen relative to the amount of halogen that may be removed from the regenerator 40 and vented through line 110. Fourth, additional beds could function as a "reservoir" for halogen that had been removed from catalyst bed 48 but which had not yet been returned to catalyst bed 58. Such a situation may arise when the regeneration conditions do not require that halogen removed from the catalyst be returned immediately to the regenerator 40.

A fifth reason that additional beds may be desirable is that the additional beds may be used to maximize halogen recovery. In one example, a bed that is being used for adsorption could be replaced with a fresh bed either long before any halogen breaks through at the outlet of the bed or well prior to when the halogen content of the adsorbent in the bed in adsorption mode has reached its maximum content. By not operating the adsorption bed to the point of maximum possible halogen loading, the full halogen capacity of the adsorbent may not be utilized, but since the risk of halogen breakthrough is minimized, halogen recovery is maximized. In another example, two beds containing adsorbent could be used in a series flow arrangement for a "lead-lag" adsorption operation. The first bed in the series, or the "lead" bed, could be used for adsorption up to or even after either halogen breaks through at the outlet of the "lead" bed, or the halogen content of the adsorbent in the "lead" bed has reached its maximum. The second bed in the series, or the "lag" bed, could adsorb any halogen that breaks through the "lead" bed. By operating the "lead" bed to the point of its maximum possible halogen loading, the full halogen capacity of the adsorbent in the "lead" bed is utilized while still maximizing halogen recovery. When halogen breakthrough has occurred in the outlet of the "lead" bed, the "lead" bed is removed from adsorption mode and replaced with the "lag" bed, and the "lag" bed is replaced with a bed that has been used for desorption.

As previously described, halogen recovery is affected by the difference between the halogen content of the adsorbent prior to adsorption (i.e., after desorption) and the halogen content of the adsorbent after adsorption (i.e., prior to desorption). Generally, the greater the difference in halogen contents, the greater is the halogen recovery. Suitable halogen recoveries are achieved when the difference between the halogen content of the adsorbent prior to adsorption (i.e., after desorption) and the halogen content of the adsorbent after adsorption (i.e., prior to desorption) is from about 0.05 to about 4.0 wt-% halogen, and in another embodiment from about 0.5 to about 1.0 wt-% halogen, based on the weight of the adsorbent.

The difference in halogen contents of the adsorbent depends on many factors, including the flow rates and compositions of the gases flowing through the adsorption and desorption beds, the adsorbent, the quantities of adsorbent used for adsorption and desorption, and other adsorption and desorption conditions, especially the difference between the adsorption and desorption temperatures. As long as there is some difference in the adsorption and desorption temperatures, then some adsorption of halogen will generally occur. With all other conditions being the same, the greater the difference in adsorption and desorption temperatures, the greater is the recovery of halogen. This increased recovery is due to either an increase in halogen pickup during adsorption (due to a lower adsorption temperature) or an increase in halogen removal during desorption (due to a higher desorption temperature). The difference in the adsorption and desorption temperatures is usually more than about 55° C. (100° F.). The difference in halogen contents also depends on the molar ratios of water to halogen during adsorption and desorption. The ratio of the molar ratio of water to halogen during adsorption to the molar ratio of water to halogen during desorption is generally from about 0 to about 2.

The relationship between, on the one hand, halogen recovery and, on the other hand, the flow rates and halogen concentrations of the streams during adsorption and desorption and the amount of adsorbent used for adsorption and desorption is that of a halogen material balance. Thus, assuming that the adsorbent in the adsorption bed has adequate capacity to adsorb a desired amount of halogen, it is possible to adsorb that amount either by using a relatively high flow rate of the gas at a relatively low inlet concentration of halogen or by using a relatively low flow rate of the gas at a relatively high concentration of halogen. Similarly, a desired amount of halogen can be desorbed from the desorption bed with either a relatively high or low flow rate of gas or with a relatively low or high concentration of halogen.

FIGS. 3–10 show other embodiments of the method disclosed herein. In all but FIG. 7, either the source of the desorption inlet gas in line 168 or the destination of the desorption effluent gas in line 218 is different from that in FIG. 1. Items in FIGS. 3–10 having the same function as items in FIG. 1 have the same item numbers.

Figure 3:
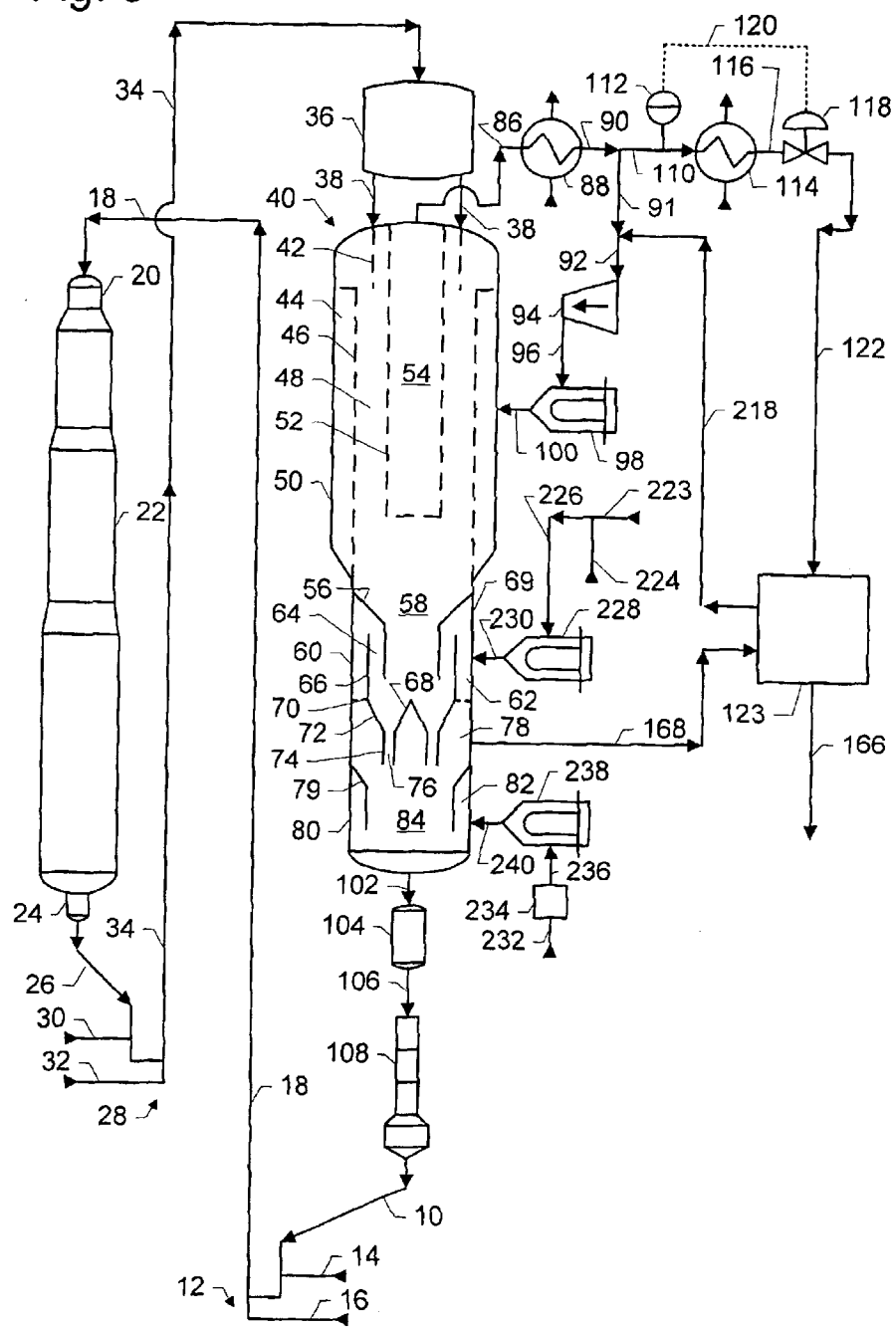

FIG. 3 shows an embodiment in which the desorption effluent from adsorption/desorption zone 123 flows to coke combustion zone 50. Referring to FIG. 3, the desorption effluent in line 218 combines with recycle gas in line 91 to form a combined stream flowing in line 92, and the combined stream enters blower 94. Makeup gas for chlorination zone 60 is provided through line 223. If desired, some or all of the chlorine-containing material introduced through line 224 can instead be added at a point in line 230 downstream of heater 228.

The flow rate of oxygen to regenerator 40 is the total flow of oxygen entering through lines 223 and 232. This flow rate of oxygen should be such that the oxygen content of the stream in line 100 is the desired concentration for the recycle gases entering coke combustion zone 50. If the flow rate of oxygen is too high when air is used for the makeup gas in both lines 232 and 223 at the desired rates for drying zone 80 and chlorination zone 60 respectively, nitrogen or a nitrogen-enriched air stream can be used for makeup gas in line 232, line 223, or both. On the other hand, if the flow rate of oxygen is too low, an oxygen-enriched air stream can be used for makeup gas in line 232, line 223, or both. A number of processes are known for depleting or enriching air streams of oxygen. These processes can use selective adsorbents, gas permeable membranes, or a combination of both to generate such streams. One such process that uses a gas permeable membrane to enrich an oxygen stream and produce a non-permeate stream with an increased nitrogen concentration is shown in U.S. Pat. No. 4,787,919, the teachings of which are herein incorporated by reference. Additional diffusion membranes for the separation of gases are also shown in U.S. Pat. No. 3,830,733, the teachings of which are incorporated by reference. These and other commercially available processes can economically produce oxygen-enriched gas streams having oxygen concentrations up to 39 mole percent or higher, or nitrogen-enriched gas streams having oxygen concentrations of 5 mole percent or lower.

Figure 4:
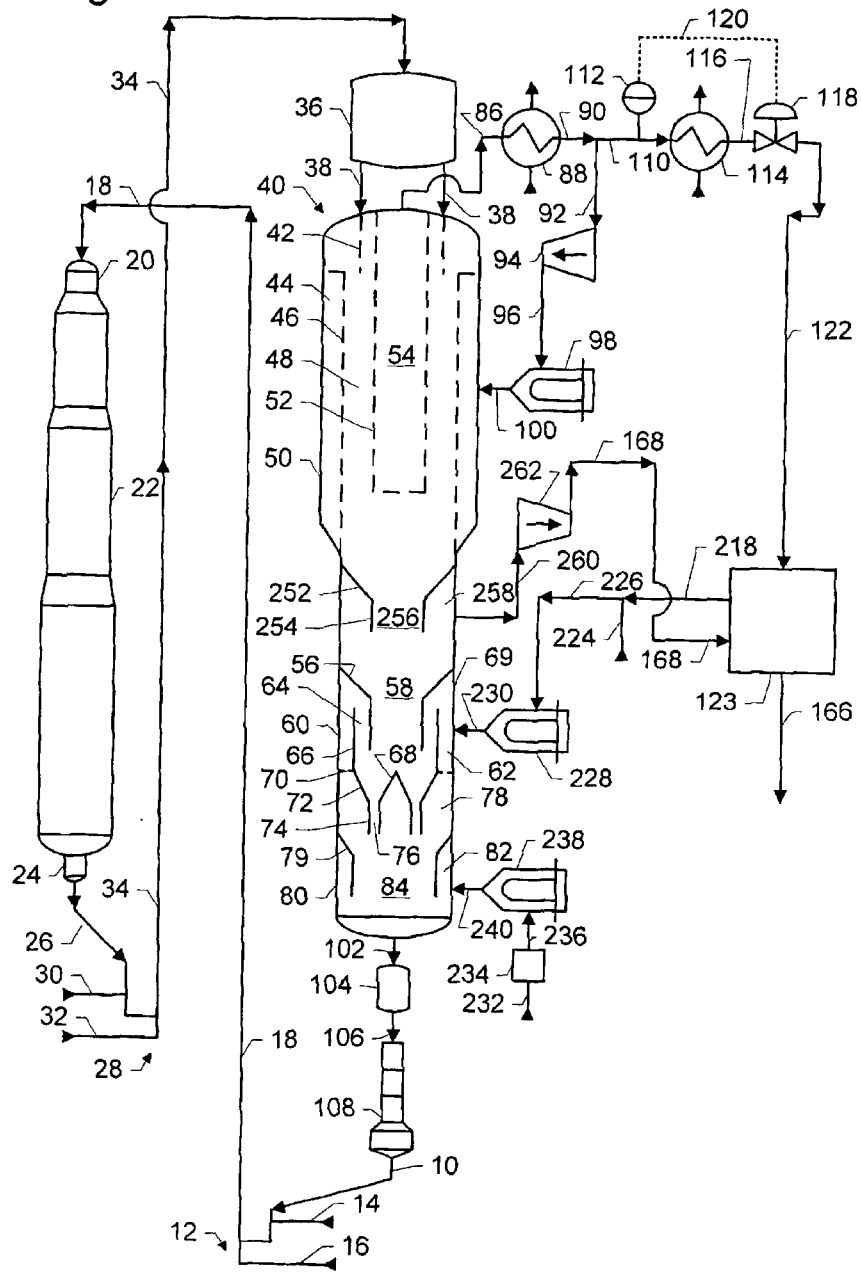

FIG. 4 shows an embodiment in which the source of the desorption inlet gas and the destination of the desorption effluent are the chlorination zone 60. Inside regenerator 40, truncated conical baffle 252 and lower cylindrical portion 254 of baffle 252 are below coke combustion zone 50 and above bed 58. Cylindrical zone 256 is defined by the lower cylindrical portion 254 of baffle 252. Zone 256 contains a cylindrical volume of catalyst particles through which gases flow upwardly through the catalyst particles into coke combustion zone 50. Chlorination bed effluent gas, which contains chlorine and hydrogen chloride, exits the top of bed 58. The majority of the upward flowing gas flows into annular space 258, which is defined by the vessel wall of regenerator 40 and baffles 252 and 254. Most of the bed 58 effluent gas flows through line 260 to blower 262, which discharges the gas into line 168 to be used for desorption. The remainder of the gas flow from bed 58 flows through zone 256. The gas flow through zone 256 is generally equal to the rate of air added to the regenerator through line 232. In contrast, the upflowing gas exiting bed 84 does not exit regenerator 40 but instead flows upward into chlorination zone 60. Some of this gas flows through zone 76 and directly enters bed 58, while the majority flows through space 78, through the orifices in partition 70, through spaces 62 and 64, and then into bed 58.

Figure 5:
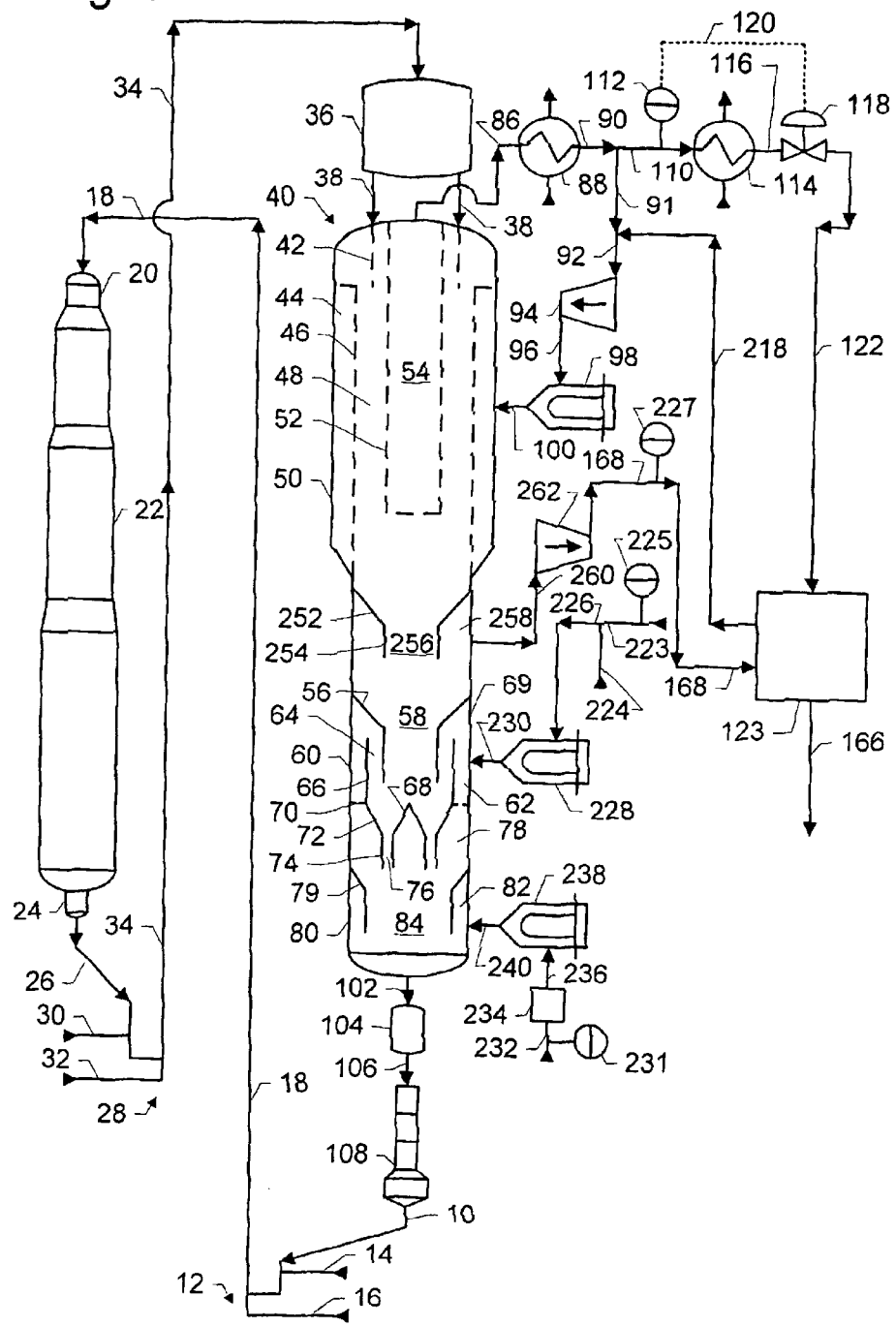

FIG. 5 shows an embodiment in which the source of the desorption inlet gas is the chlorination zone 60 and the destination of the desorption effluent is the coke combustion zone 50. As previously described for FIG. 4, truncated conical baffle 252, lower cylindrical portion 254 of baffle 252, cylindrical zone 256, and annular space 258 are inside regenerator 40. As in FIG. 4 also, gas from space 258 flows through line 260, to blower 262, and into line 168 for desorption. The gas flow rate through line 168 is controlled by blower 262 or flow indicator-controller 227. As previously described for FIG. 3, makeup gas for chlorination zone 60 enters the process through line 223, makeup chlorine-containing materials may be added downstream of heater 230, and the total flow rate of oxygen to regenerator 40 through lines 223 and 232 is controlled. The gas flow rates through lines 223 and 232 are controlled by flow indicator-controllers 225 and 231, respectively, so that the total flow rate of gas through lines 223 and 232 is greater than the gas flow rate through line 168. As in FIG. 3 also, desorption effluent gas in line 218 combines with recycle gas in line 91 to form in line 92 a combined stream, which enters blower 94.

Figure 6:
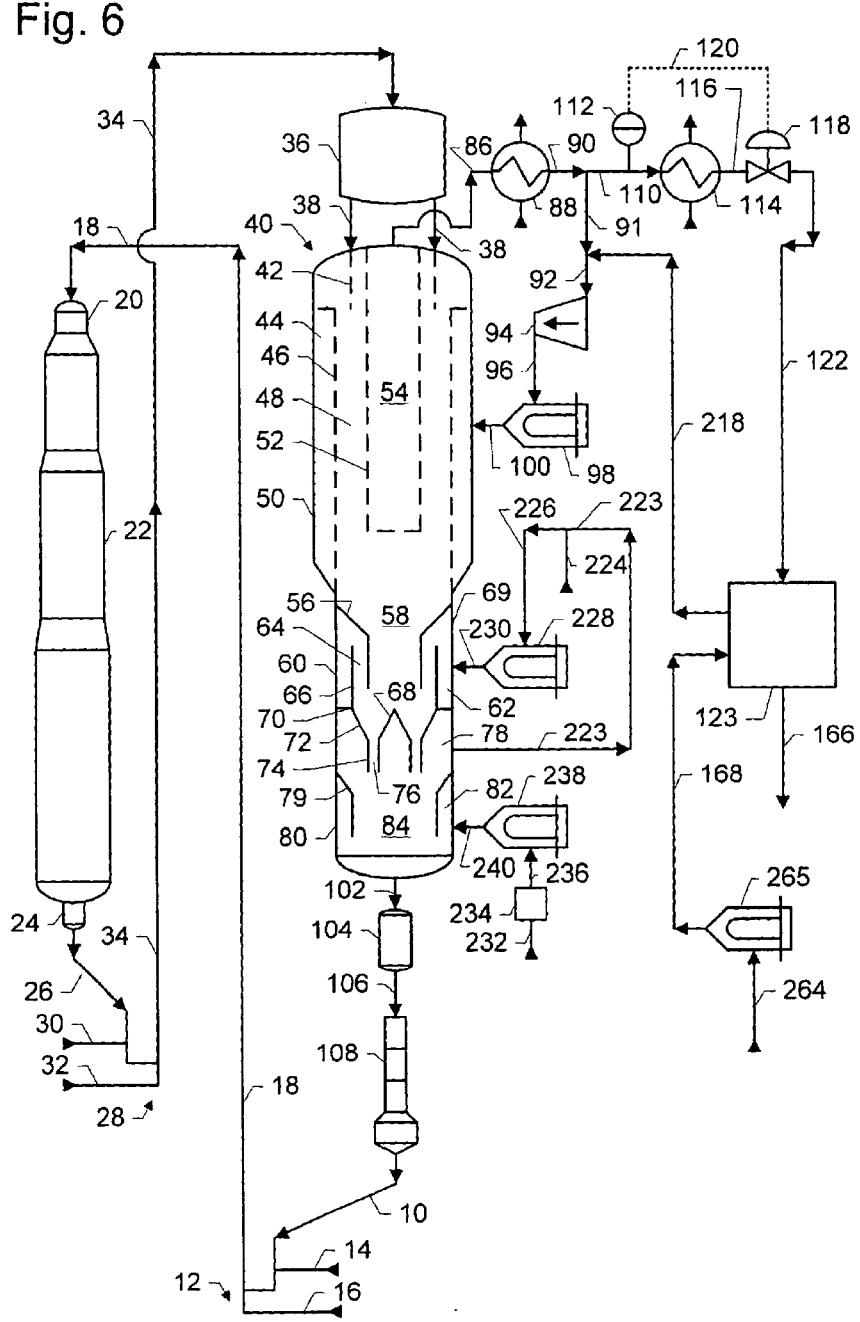

FIG. 6 shows an embodiment in which the source of the desorption inlet gas is an external gas supply and the destination of the desorption effluent is the coke combustion zone 50. Air in line 264, which does not need to be dried, enters heater 266, which raises the temperature of the air stream to about the desired desorption gas inlet temperature for desorption. The heated air stream passes through line 168 and zone 123 to be used for desorption. The total flow of gas through line 264 is controlled in order to attain a desired desorption rate. The total flow rate of oxygen to regenerator 40 through lines 232 and 264 can be controlled using oxygen-enriched and oxygen-depleted streams. As previously described for FIG. 3, desorption effluent gas in line 218 combines with recycle gas in line 91 to form in line 92 a combined stream, which enters blower 94. As in FIG. 3 also, gas exiting upward from bed 84 flows into space 78 and is withdrawn from regenerator 40. However, instead of first passing through zone 123 as in FIG. 3, in FIG. 6 this gas stream flows through line 223 directly to the junction with the line 224. Like the process shown in FIG. 3, most of the gas exiting bed 84 is induced to flow through line 223 by the seal for gas flow caused by the catalyst particles in zone 76 and by pressure drop across partition 70. Alternatively, if little or no heat needs to be added to the gas flowing from bed 84 to bed 58, then heater 228 would be eliminated, along with lines 223, 224, and 226. In that case, most of the gas would flow through the restriction orifices in partition 70 and line 230 would be used to add halogen to space 62. To help disperse the halogen in the upflowing gases, a pipe connection preferably in the form of a "T" would be connected to the end of line 230.

Figure 7:
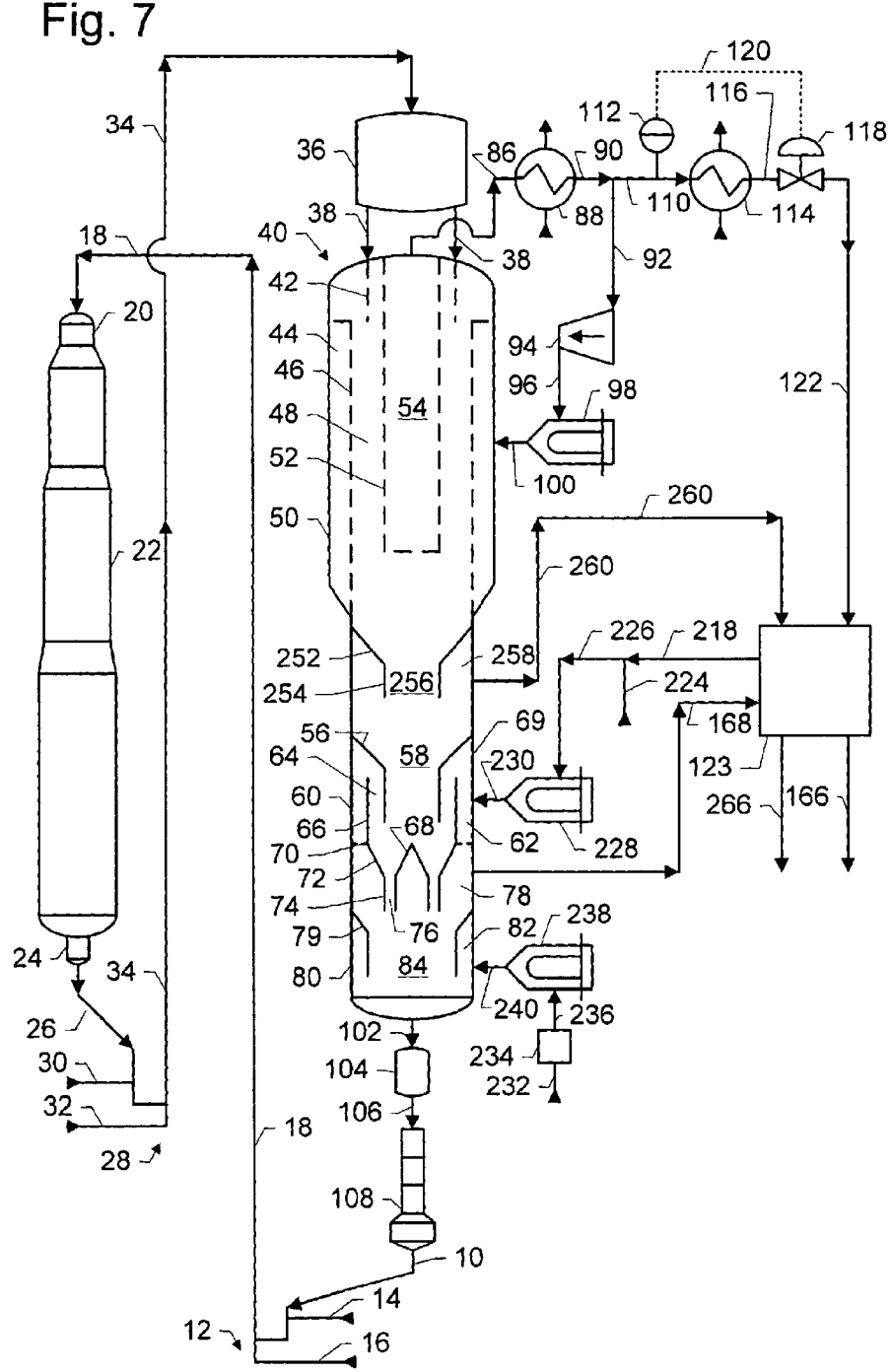

FIG. 7 shows an embodiment in which the source of the desorption inlet gas is the effluent of the drying zone 80 and the destination of the desorption effluent is the chlorination zone 60, as in FIG. 1. However, the flow of oxygen in the chlorination bed effluent gas exiting from catalyst bed 58 exceeds the flow needed in coke combustion zone 50. This can occur when the air entering through line 232 exceeds the makeup air requirement for coke combustion. Chlorination bed effluent gas, which contains chlorine and hydrogen chloride, exits the top of bed 58. Some of the gas flows upwardly through the catalyst particles into coke combustion zone 50. The excess chlorination bed effluent gas flows into annular space 258 and line 260 to adsorption/desorption zone 123 in order to remove at least some of the chlorine and hydrogen chloride from this excess gas. The gas flow through line 260 is regulated by a flow control valve (not shown) whose extent of opening is regulated by a signal (not shown) generated by an analyzer-controller (not shown) that measures the oxygen concentration in line 100. The arrangement of the adsorption/desorption zone 123 shown in FIG. 2 can be modified in order to remove chlorine and hydrogen chloride not only from the vent gas stream in line 122 but also from the excess chlorination bed effluent gas in line 260. One possible modification would be to add to zone 123 another adsorbent bed (not shown) in adsorption mode, adding lines to route the gas in line 260 to that additional bed and to recover an effluent stream from that bed, and discharging the effluent stream of that bed from zone 123 through line 266. If such an additional bed is used for adsorption, the chlorine which accumulates on that bed would be removed by placing the bed in desorption mode, as has already been described for bed 152. Another modification could comprise combining the gas streams in lines 260 and 122 to form a combined inlet stream, passing that combined inlet stream to bed 150 in the manner already described for the stream in line 122, and recovering and discharging a combined effluent stream from zone 123 in the manner already described for the stream in line 166.

Figure 8:
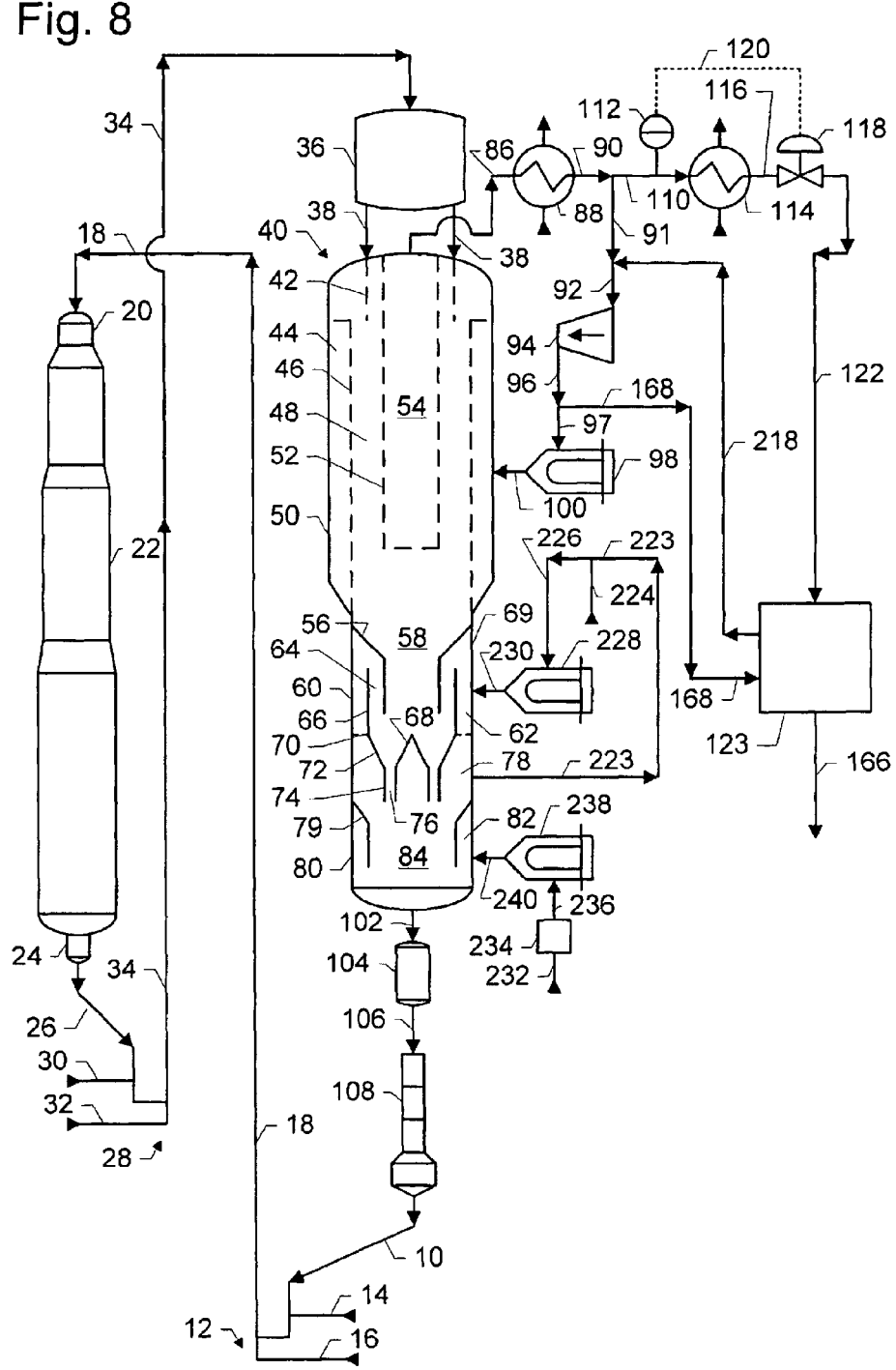

FIG. 8 shows an embodiment in which the source of the desorption inlet gas and the destination of the desorption effluent are the coke combustion zone 50. Recycle gas from the discharge of blower 94 flows through line 96 and splits into two portions. One portion flows through line 97, heater 98, and line 100, and enters coke combustion zone 50. The other portion flows through line 168 to zone 123 for desorption. As in FIG. 3, desorption effluent gas in line 218 combines with recycle gas in line 91 to form in line 92 a combined stream, which enters blower 94. However, the gas in line 218 can return to the coke combustion zone 50 at any suitable location that is at a sufficiently low pressure so as to provide a driving force for the gas to flow. Possible alternatives to combining the gas in line 218 with gas flowing in line 91 include combining the gas in line 218 with the gas flowing in line 97, 100, 86, or 90. The flows of catalyst particles and gas in drying zone 80 and chlorination zone 60 are the same as in the process shown in FIG. 6. If the air entering through line 232 exceeds the makeup air requirement for coke combustion, the excess gas can be withdrawn from the drying bed effluent gas stream flowing in line 223 through a line (not shown) and passed to a previously-described, suitably-modified adsorption/desorption zone 123 in order to remove at least some of the chlorine and hydrogen chloride from this excess gas.

Figure 9:
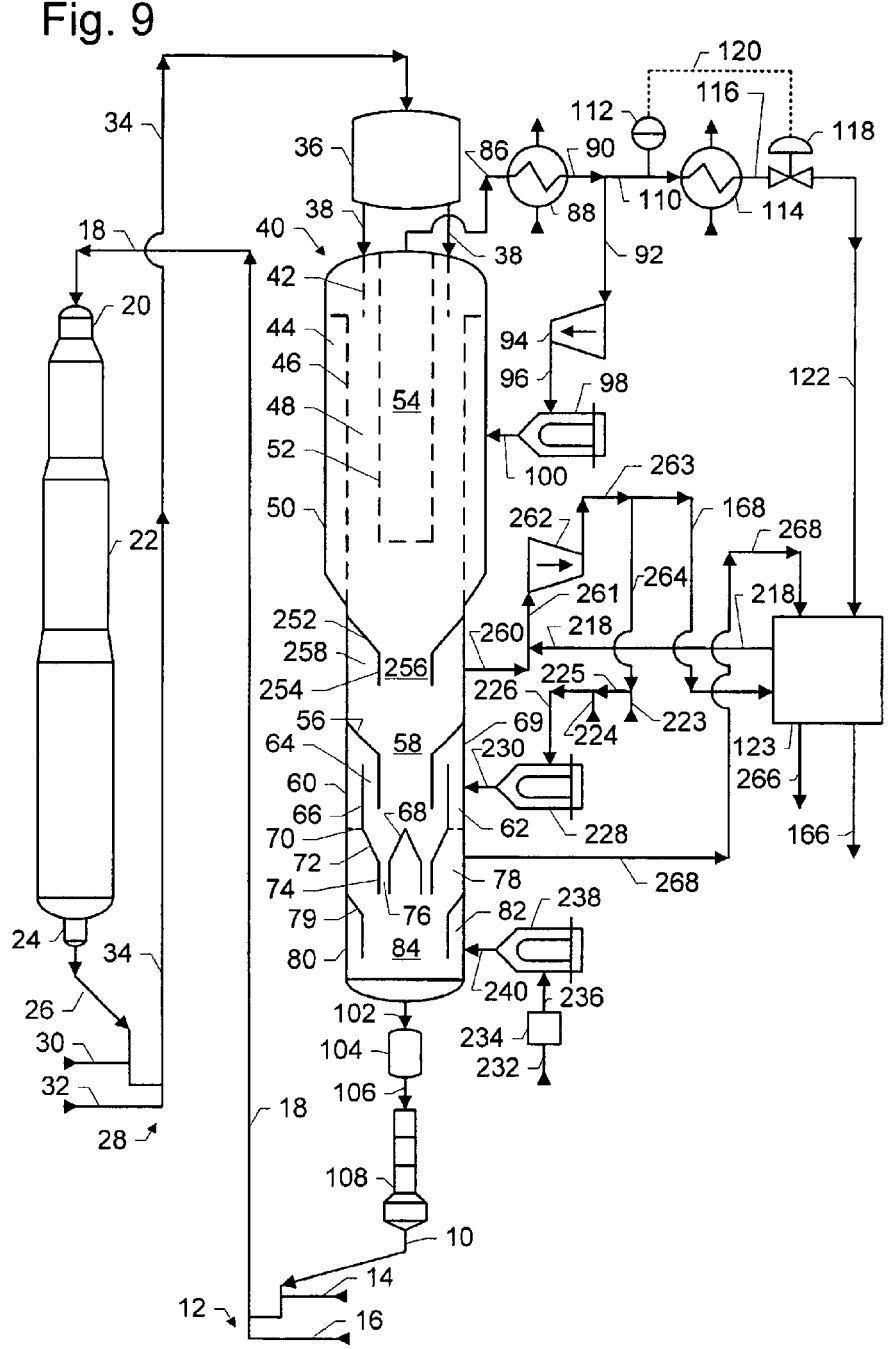

FIG. 9 shows an embodiment in which the source of the desorption inlet gas is gas for the inlet of the chlorination zone 60 and the destination of the desorption effluent is the outlet of the chlorination zone 60. The chlorination bed effluent gas exits the regenerator 40 through line 260 and combines with the desorption effluent gas in line 218. The combined stream flows through line 261 to blower 262, which discharges the gas into line 263. A relatively small portion of the gas in line 263 flows through line 168 and is used for desorption, while most of the gas flows through line 264 and is recycled to the chlorination zone 60. If needed for proper chlorination conditions, water can added to this recycle stream through line 223 and chlorine-containing materials can be added through line 224. The recycle stream flows through line 225, line 226, heater 228, and line 230, and then enters chlorination zone 50. In this embodiment, the flow of oxygen in the drying bed effluent gas exiting from catalyst bed 84 exceeds the flow needed in coke combustion zone 50. The excess drying bed effluent gas, which contains chlorine and hydrogen chloride, flows through annular space 78 and exits regenerator 40. The flow of gas through line 268 is regulated by a control valve (not shown), which is regulated by an oxygen-analyzer-controller (not shown) located on line 96 or 100. To remove the chlorine and hydrogen chloride from this gas, the gas flows through line 268 to adsorption/desorption zone 123. As described previously, zone 123 can be suitably modified to remove chlorine and hydrogen chloride from two gas streams, namely the vent gas stream in line 122 and the excess drying bed effluent gas in line 268.

Figure 10:
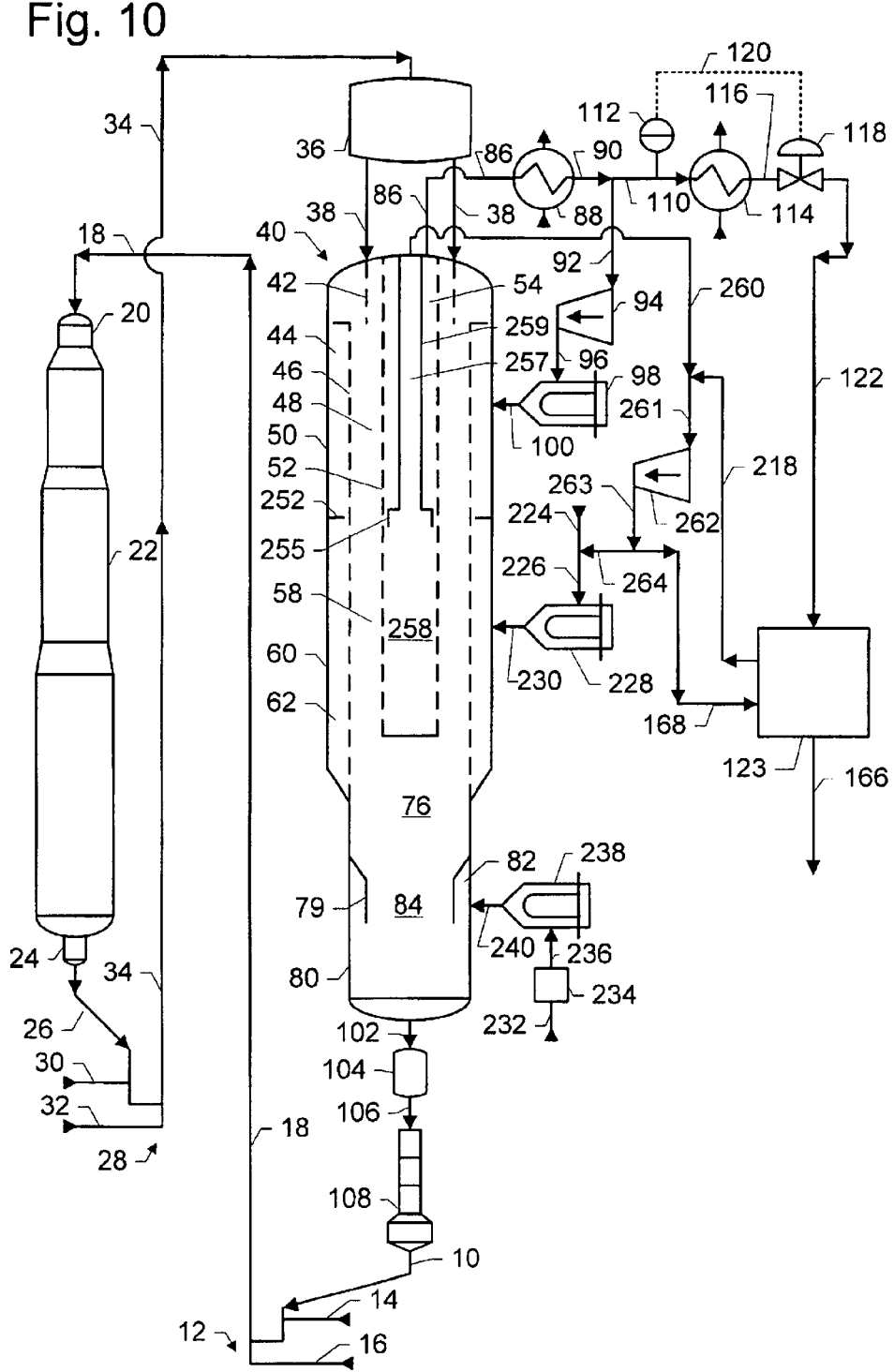

FIG. 10 shows another embodiment in which the source of the desorption inlet gas is gas for the inlet of the chlorination zone 60 and the destination of the desorption effluent is the outlet of the chlorination zone 60, as in FIG. 9. However, unlike FIG. 9, in FIG. 10 regenerator 40 has a chlorination zone 60 with a catalyst bed 58 that is annular rather than cylindrical. Such regenerators are described in U.S. Pat. No. 3,652,231 (Greenwood et al.); U.S. Pat. No. 4,647,549 (Greenwood); U.S. Pat. No. 4,980,325 (Sechrist); U.S. Pat. No. 5,053,371 (Williamson); and U.S. Pat. No. 5,376,607 (Sechrist), the teachings of all of which are hereby incorporated herein in their entirety. Annular catalyst bed 58 is formed below annular catalyst bed 48 by screens 46 and 52. These screens extend from the bottom of coke combustion zone 50 to the bottom of chlorination zone 60, and the catalyst flows downward through chlorination zone 60 by gravity between the screens. The bottom of inner screen 52 is closed. The bottom of bed 58 is open to allow catalyst particles to empty from bed 58 into cylindrical open space or zone 76. Catalyst particles flow from the bed in zone 76 into bed 84 of drying zone 80.

Looking now to the gas flow through chlorination zone 60, circulating chlorination inlet gas enters chlorination zone 60 through line 230. The circulating gas is distributed in annular chamber 62, which extends around screen 46 and is defined by screen 46 and the vessel wall of regenerator 40. A donut-shaped baffle 252 separates annular chambers 44 and 62 and helps to segregate the coke combustion and chlorination inlet gases, although some crossflow past baffle 252 may occur. An upper boundary for central section 258, as well as a lower boundary for section 54, is an enlarged end 255 of chlorination zone outlet conduit 259. However, crossflow of gas between zones past baffle 252 or end 255 may occur.

As the circulating chlorination inlet gas passes through catalyst bed 58, chlorination, oxidation, and dispersion of the catalyst take place. Gas that contains oxygen, chlorine, and hydrogen chloride flows upward from the catalyst in zone 76, flows into the bottom of bed 58, and combines with the circulating gas. The combined gases exit bed 58 and collect in central section 258. The gas that collects in central section 258 typically contains water, chlorine, and hydrogen chloride. Most of the gas that collects in section 258 enters end 255 and flows upward through space 257 within conduit 259. Conduit 259 occupies a portion of section 54, and is concentric with regenerator 40.

The gas in conduit 259 exits regenerator 40 through line 260 and combines with the desorption effluent gas in line 218. The combined stream flows through line 261 to blower 262, which discharges the gas into line 263. A relatively small portion of the gas in line 263 flows through line 168 and is used for desorption, while most of the gas flows through line 264 and is recycled to the chlorination zone 60. If needed for proper chlorination conditions, chlorine-containing materials can be added through line 224. The recycle stream flows through line 226, heater 228, and line 230, and then re-enters chlorination zone 50.

What is claimed is:

1. A method for decreasing the environmental release of halogen while regenerating catalyst particles, the method comprising:
    a) withdrawing a catalyst bed effluent stream comprising halogen from a catalyst bed, wherein the catalyst bed contains catalyst particles containing halogen;
    b) passing a first portion of the catalyst bed effluent stream comprising halogen to the catalyst bed, and at least partially regenerating at least a portion of the catalyst particles in the catalyst bed and removing at least a portion of the halogen from the catalyst particles in the catalyst bed;
    c) contacting a second portion of the catalyst bed effluent stream comprising halogen with adsorbent in a first adsorbent bed, removing halogen from the second portion of the catalyst bed effluent stream, and withdrawing from the first adsorbent bed a first adsorbent bed effluent stream;
    d) contacting an adsorbent bed inlet stream with adsorbent in a second adsorbent bed, the adsorbent in the second adsorbent bed containing halogen, removing halogen from the adsorbent in the second adsorbent bed, and withdrawing from the second adsorbent bed a second adsorbent bed effluent stream comprising halogen;
    e) passing at least a portion of the second adsorbent bed effluent stream comprising halogen to the catalyst bed; and
    f) at least intermittently moving catalyst particles through the catalyst bed by withdrawing catalyst particles from the catalyst bed and adding catalyst particles to the catalyst bed.

2. The method of claim 1 further characterized in that the passing of the at least a portion of the second adsorbent bed effluent stream to the catalyst bed comprises combining the at least a portion of the second adsorbent bed effluent stream with the first portion of the catalyst bed effluent stream to form a combined stream, and the passing of the first portion of the catalyst bed effluent stream to the catalyst bed comprises passing at least a portion of the combined stream to the catalyst bed.

3. The method of claim 2 further characterized in that the adsorbent bed inlet stream comprises a first portion of the combined stream, and the passing of at least a portion of the combined stream to the catalyst bed comprises passing a second portion of the combined stream to the catalyst bed.

4. The method of claim 1 further characterized in that the adsorbent bed inlet stream comprises a gas selected from the group consisting of air, oxygen, nitrogen, and mixtures thereof.

5. The method of claim 1 further characterized in that the at least partially regenerating of at least a portion of the catalyst particles comprises a regeneration step selected from the group consisting of removing coke from catalyst particles, adding halogen to catalyst particles, redispersing metal on catalyst particles, oxidizing metal on catalyst particles, drying catalyst particles, and reducing metal on catalyst particles.

6. The method of claim 1 further characterized in that the functions of the first adsorbent bed and the second adsorbent bed are at least intermittently shifted by operating the first adsorbent bed to function as the second adsorbent bed and operating the second adsorbent bed to function as the first adsorbent bed.

7. The method of claim 1 wherein the halogen is chlorine or fluorine.

8. The method of claim 1 wherein the catalyst bed effluent stream comprises a molecule selected from the group consisting of hydrogen chloride and molecular chlorine.

9. The method of claim 1 wherein the adsorbent in the first adsorbent bed and the adsorbent in the second adsorbent bed are selected from the group consisting of a molecular sieve, silica gel, carbon, and alumina.

10. The method of claim 1 wherein the catalyst particles comprise a catalyst selected from the group consisting of a reforming catalyst, an isomerization catalyst, and a dehydrogenation catalyst.

11. A method for decreasing the environmental release of a halogen from a process for regenerating catalyst particles, the method comprising:
a) withdrawing a first catalyst bed effluent stream comprising halogen from a first catalyst bed, wherein the first catalyst bed contains catalyst particles containing halogen;
b) passing a first portion of the first catalyst bed effluent stream comprising halogen to the first catalyst bed, and at least partially regenerating at least a portion of the catalyst particles in the first catalyst bed and removing at least a portion of the halogen from the catalyst particles in the first catalyst bed;
c) passing a catalyst bed inlet stream comprising halogen to a second catalyst bed containing catalyst particles, and at least partially regenerating at least a portion of the catalyst particles in the second catalyst bed;
d) contacting a second portion of the first catalyst bed effluent stream comprising halogen with adsorbent in a first adsorbent bed, removing halogen from the second portion of the first catalyst bed effluent stream, and withdrawing from the first adsorbent bed a first adsorbent bed effluent stream;
e) contacting an adsorbent bed inlet stream with adsorbent in a second adsorbent bed, the adsorbent in the second adsorbent bed containing halogen, removing halogen from the adsorbent in the second adsorbent bed, and withdrawing from the second adsorbent bed a second adsorbent bed effluent stream comprising halogen;
f) passing at least a portion of the second adsorbent bed effluent stream comprising halogen to at least one of the first catalyst bed and the second catalyst bed; and
g) at least intermittently moving catalyst particles through the first catalyst bed by withdrawing catalyst particles from the first catalyst bed and adding catalyst particles to the first catalyst bed.

12. The method of claim 11 wherein the at least a portion of the second adsorbent bed effluent stream passes to the second catalyst bed.

13. The method of claim 12 further characterized in that the passing of at least a portion of the second adsorbent bed effluent stream to the second catalyst bed comprises combining the at least a portion of the second adsorbent bed effluent stream with the catalyst bed inlet stream to form a combined stream, and the passing of the catalyst bed inlet stream to the second catalyst bed comprises passing at least a portion of the combined stream to the second catalyst bed.

14. The method of claim 11 further characterized in that a second catalyst bed outlet stream is withdrawn from the second catalyst bed and the adsorbent bed inlet stream is formed from at least a portion of the second catalyst bed outlet stream.

15. The method of claim 11 further characterized in that catalyst particles are moved at least intermittently through the second catalyst bed by withdrawing catalyst particles from the second catalyst bed and passing catalyst particles withdrawn from the first catalyst bed to the second catalyst bed.

16. A method for reducing chloride emissions of a catalyst regeneration zone, the method comprising:
a) withdrawing a coke combustion bed effluent stream comprising chloride from a coke combustion catalyst bed in a regeneration zone, the coke combustion catalyst bed containing catalyst particles, the catalyst particles having coke deposits thereon and containing chloride;
b) passing a first portion of the coke combustion bed effluent stream comprising chloride to the coke combustion catalyst bed, removing at least a portion of the coke deposits from catalyst particles and removing at least a portion of the chloride from catalyst particles in the coke combustion catalyst bed, the coke combustion catalyst bed operating at a gas inlet temperature of from about 316 to about 649° C.
c) withdrawing a second portion of the coke combustion bed effluent stream comprising chloride from the regeneration zone, contacting at least a portion of the second portion of the coke combustion bed effluent stream with adsorbent in a first adsorbent bed, the first adsorbent bed operating at an adsorption temperature of from about 66 to about 482° C., removing chloride from the at least a portion of the second portion of the coke combustion bed effluent stream, and withdrawing from the first adsorbent bed a first adsorbent bed effluent stream;
d) contacting an adsorbent bed inlet stream with adsorbent in a second adsorbent bed, the adsorbent in the second adsorbent bed containing chloride, removing chloride from adsorbent in the second adsorbent bed, the second adsorbent bed operating at a temperature of more than about 55° C. higher than the adsorption temperature, and withdrawing from the second adsorbent bed a second adsorbent bed effluent stream comprising chloride;

e) passing at least a portion of the second adsorbent bed effluent stream comprising chloride to the regeneration zone; and f) at least intermittently moving catalyst particles through the coke combustion catalyst bed by withdrawing catalyst particles from the coke combustion catalyst bed and adding catalyst particles to the coke combustion bed.

17. The method of claim 16 wherein the regeneration zone comprises at least one bed of catalyst particles selected from the group consisting of a chlorination catalyst bed, redispersion catalyst bed, oxidation catalyst bed, drying catalyst bed, and reduction catalyst bed.

18. The method of claim 16 further characterized in that the regeneration zone comprises a chlorination catalyst bed containing catalyst particles, the at least a portion of the second adsorbent bed effluent stream passes to the chlorination catalyst bed, and chloride is added to at least a portion of the catalyst particles in the chlorination catalyst bed, the chlorination catalyst bed operating at a gas inlet temperature of from about 370 to about 650° C.

19. The method of claim 16 further characterized in that the regeneration zone comprises a drying catalyst bed containing catalyst particles, the at least a portion of the second adsorbent bed effluent stream passes to the drying catalyst bed, water is removed from at least a portion of the catalyst particles in the drying catalyst bed and chloride is added to at least a portion of the catalyst particles in the drying catalyst bed, the drying catalyst bed operating at a gas inlet temperature of from about 425 to about 650° C.

20. The method of claim 16 further characterized in that the functions of the first adsorbent bed and the second adsorbent bed are at least intermittently shifted by operating the first adsorbent bed to function as the second adsorbent bed and operating the second adsorbent bed to function as the first adsorbent bed, the adsorbent in the first adsorbent bed has an initial chloride content based on the weight of the adsorbent in the first adsorbent bed prior to the contacting and removal in (c), the adsorbent in the first adsorbent bed has a final chloride content based on the weight of the adsorbent in the first adsorbent bed after the contacting and removal in (c) and prior to the operating of the first adsorbent bed to function as the second adsorbent bed, and the difference between the final chloride content and the initial chloride content is from about 0.05 to about 4.0 wt-% chloride.

21. The method of claim 16 further characterized in that the first adsorbent bed operates at adsorption conditions comprising an adsorption temperature and an adsorption molar ratio of water to halogen, the second adsorbent bed operates at desorption conditions comprising a desorption temperature and a desorption molar ratio of water to halogen, the difference between the desorption temperature and the adsorption temperature is more than about 55° C., and the ratio of the adsorption molar ratio to the desorption molar ratio is from about 0 to about 2.

* * * * *